(12) United States Patent
Nakae et al.

(10) Patent No.: US 8,380,432 B2
(45) Date of Patent: Feb. 19, 2013

(54) MAP INFORMATION PROCESSING APPARATUS

(75) Inventors: Tomohiro Nakae, Tokyo (JP); Atsushi Kohno, Tokyo (JP); Tomoya Ikeuchi, Tokyo (JP); Masaharu Umezu, Tokyo (JP); Makoto Mikuriya, Tokyo (JP); Mitsuo Shimotani, Tokyo (JP); Fumitaka Satou, Tokyo (JP); Yuta Kawana, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 875 days.

(21) Appl. No.: 12/440,567

(22) PCT Filed: Jun. 27, 2007

(86) PCT No.: PCT/JP2007/062924
§ 371 (c)(1),
(2), (4) Date: Mar. 9, 2009

(87) PCT Pub. No.: WO2008/044375
PCT Pub. Date: Apr. 17, 2008

(65) Prior Publication Data
US 2010/0057352 A1    Mar. 4, 2010

(30) Foreign Application Priority Data
Oct. 12, 2006    (JP) .................................. 2006-278916

(51) Int. Cl.
G01C 21/00    (2006.01)
(52) U.S. Cl. ........ 701/450; 701/446; 701/445; 701/409; 701/461
(58) Field of Classification Search .................. 701/409, 701/445, 446, 450, 461
See application file for complete search history.

(56) References Cited

U.S. PATENT DOCUMENTS

| | | | | |
|---|---|---|---|---|
| 4,514,810 A * | 4/1985 | Ito et al. | .......................... | 701/454 |
| 4,982,332 A * | 1/1991 | Saito et al. | ..................... | 701/450 |
| 6,356,837 B1 * | 3/2002 | Yokota et al. | ................. | 701/411 |
| 7,003,397 B2 * | 2/2006 | Yokota et al. | ................. | 701/454 |
| 7,480,565 B2 * | 1/2009 | Ikeuchi et al. | ................ | 701/410 |
| 7,496,447 B2 * | 2/2009 | Tanaka | ........................... | 701/450 |
| 7,783,421 B2 * | 8/2010 | Arai et al. | ..................... | 701/420 |

(Continued)

FOREIGN PATENT DOCUMENTS
EP    1 530 025 A2    5/2005
JP    7-260499 A    10/1995
(Continued)

*Primary Examiner* — Stefanos Karmis
*Assistant Examiner* — Ernesto Suarez
(74) *Attorney, Agent, or Firm* — Birch, Stewart, Kolasch & Birch, LLP

(57) ABSTRACT

A map information processing apparatus includes a road matching means (143) for comparing the road data with current position data to carry out map matching, an input unit (130) for inputting both a specified detection start point and a specified detection end point, an unregistered road detection means (144) to which both the specified detection start point and the specified detection end point are inputted, for detecting, as an unregistered road, a section between a detection start point and a detection end point of the unregistered road which are acquired on the basis of either the map matching carried out by the road matching means or the result of comparison between running track data and the road data, and a road data generating means (145) for generating road data corresponding to the detected unregistered road and storing the road data in a map data storage means.

14 Claims, 15 Drawing Sheets

U.S. PATENT DOCUMENTS

| | | | |
|---|---|---|---|
| 7,797,103 B2* | 9/2010 | Ishigami et al. | 701/417 |
| 2006/0111837 A1 | 5/2006 | Tauchi | |
| 2009/0319174 A1* | 12/2009 | Ishigami et al. | 701/201 |
| 2010/0042315 A1* | 2/2010 | Ikeuchi et al. | 701/200 |
| 2011/0238294 A1* | 9/2011 | Shikimachi et al. | 701/201 |

FOREIGN PATENT DOCUMENTS

| | | |
|---|---|---|
| JP | 8-271272 A | 10/1996 |
| JP | 2001-74485 A | 3/2001 |
| JP | 2006-170970 A | 6/2006 |
| JP | 2006-266759 A | 10/2006 |

* cited by examiner

FIG. 6
(a)
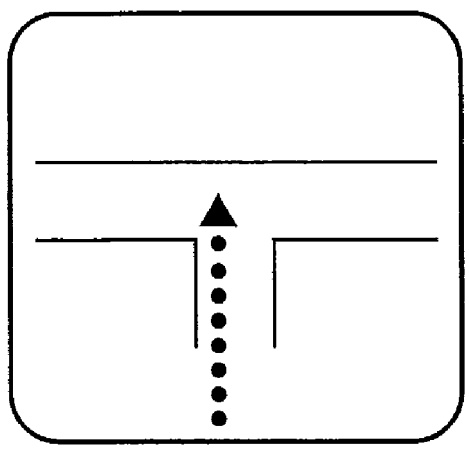
(b)
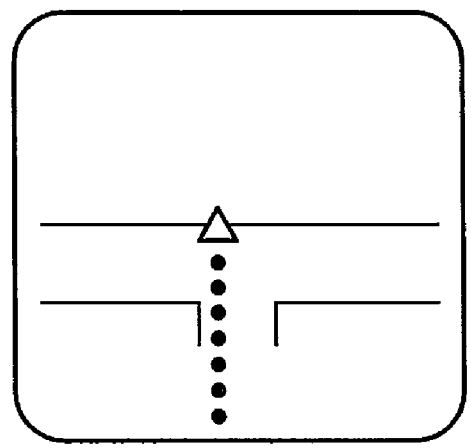
(c)
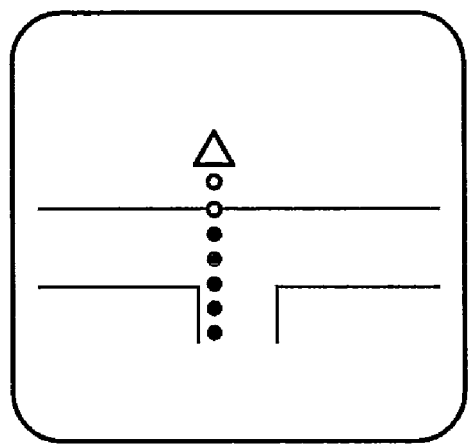
(d)
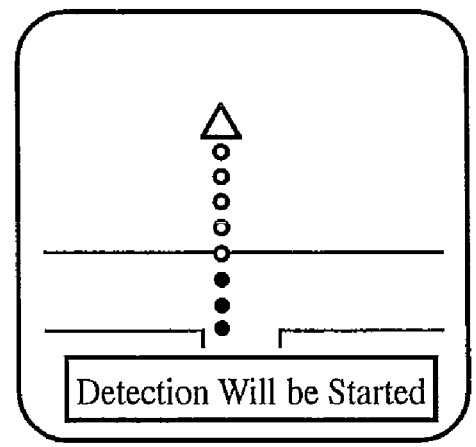

FIG. 10
(a)
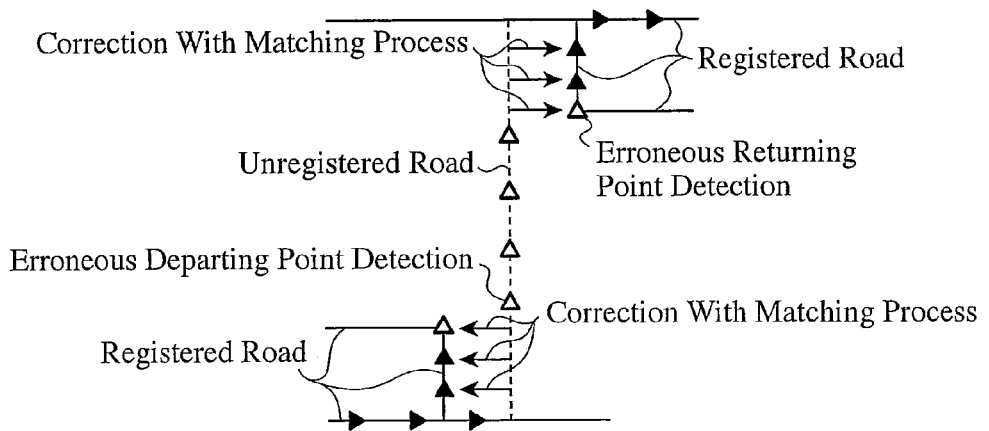
(b)
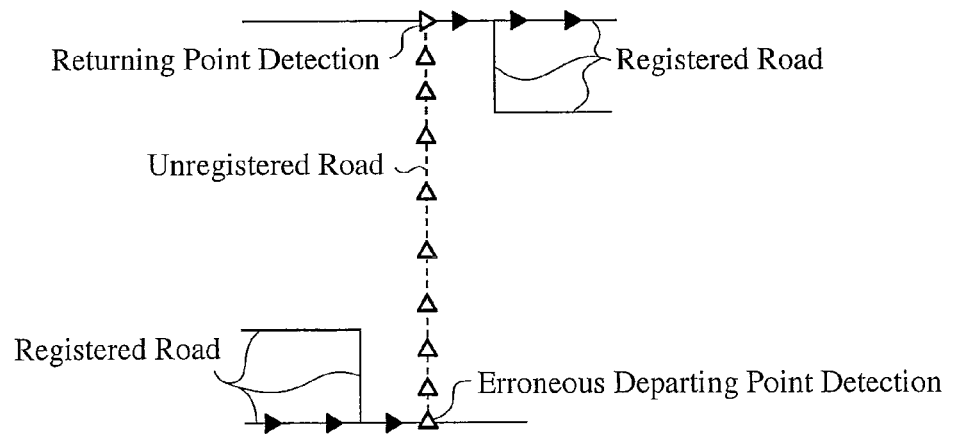

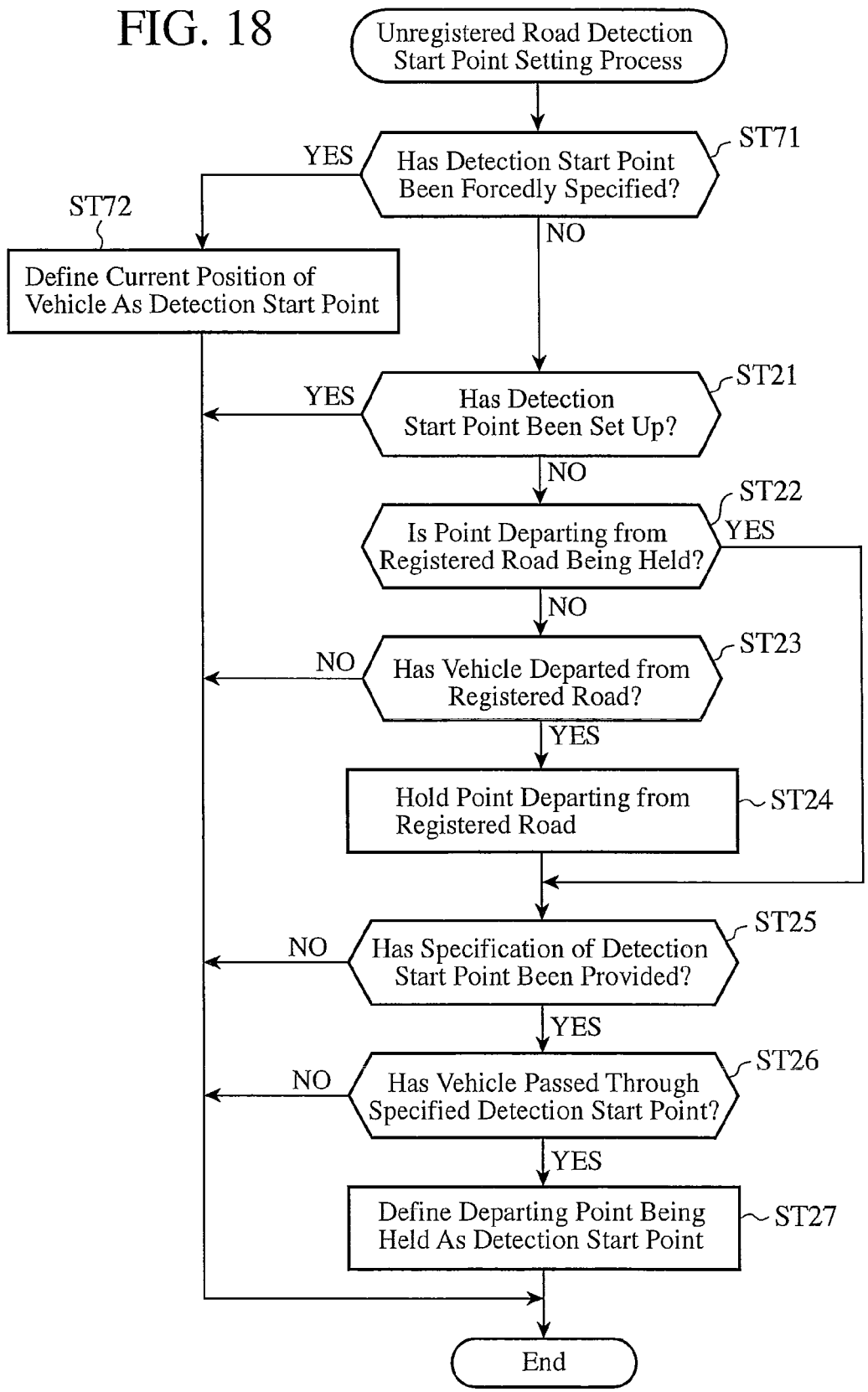

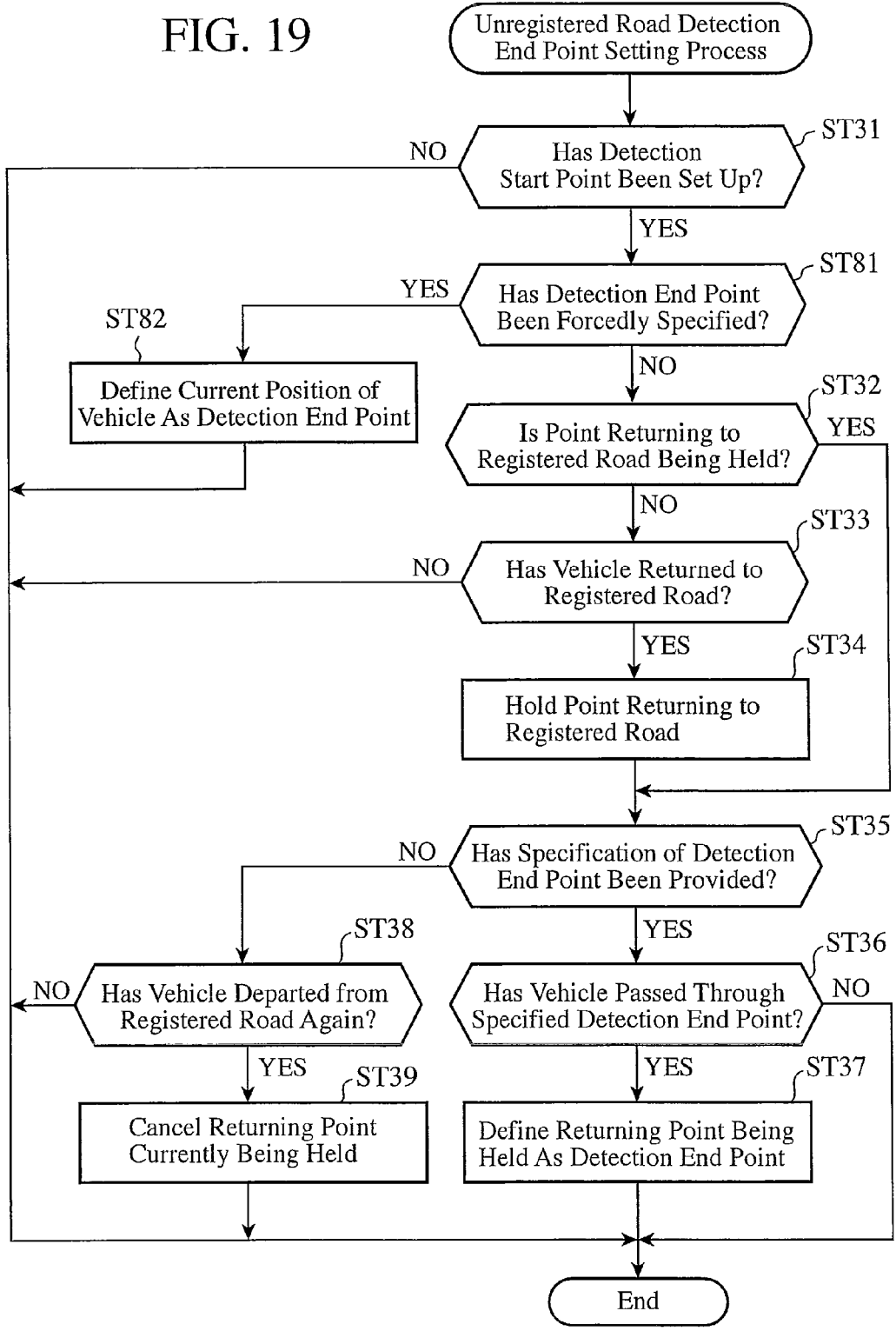

MAP INFORMATION PROCESSING APPARATUS

FIELD OF THE INVENTION

The present invention relates to a map information processing apparatus which processes map information. More particularly, it relates to a technology of detecting an unregistered road which has not been registered into a map database to register the unregistered road into the map database.

BACKGROUND OF THE INVENTION

As a technology of registering an unregistered road into a map database, patent reference 1 discloses a navigation apparatus which, when a vehicle passes through a road whose information is not included in its road information, holds the information and registers, as a new road, the road therein to enable navigation without waiting for an update or revision of a CD-ROM having the road information. This navigation apparatus is provided with a GPS receiving unit, a display unit for displaying the vehicle position, a CD-ROM drive unit for reading data from the CD-ROM which stores the map information, and a control unit having a road information storage memory, and converts track data about the vehicle into straight lines and nodes when detecting a departure of the vehicle position from any road whose information is included in the road information stored in the CD-ROM or according to a command input by a user, starts storing them in the road information memory, and, when the vehicle position returns to a road whose information is included in the road information stored in the CD-ROM or when ending the storing operation according to the user's specification, registers the track data about the vehicle as a new road.

Patent reference 2 discloses a navigation system which can perform an addition, a deletion, a change, and so on of data on existing map information. This navigation system displays a map on the basis of the map information and searches for a route to a destination and performs route guidance, and is provided with a reference point setting means for setting up a plurality of reference points each of which is a starting point or an end point of a road, a position detecting means for detecting the position of a vehicle, a map information generating means for generating road information on the basis of the position information detected by the position detecting means when the vehicle moves from a first reference point which is one of the plurality of reference points to a different second point by way of a road whose information is not included in the map information, and an additional map information storage means for storing the road information generated by the map information generating means as a part of the map information.

[Patent reference 1] JP,8-271272,A
[Patent reference 2] JP,2001-74485,A

However, because the navigation apparatus shown in above-mentioned patent reference 1 compares roads shown by the road information with the vehicle position, and sequentially stores the track data about the vehicle in the road information memory while carrying out map matching of modifying the vehicle position in such a way that the vehicle position is located on a road, when the vehicle is running along an unregistered road, the navigation apparatus enters a state in which the navigation apparatus provides erroneous map matching between the vehicle position and a road in the vicinity of the unregistered road, and therefore cannot store correct track data about the unregistered road in the road information memory. As a result, there arises a problem that correct data about an unregistered road cannot be acquired.

The navigation system disclosed by patent reference 2 presets up a plurality of reference points each of which is a starting point or an end point of a road, and, when the vehicle moves from one of the plurality of reference points to a different reference point by way of a road whose information is not included in the map information, generates road information on the basis of position information detected, and stores the generated road information as a part of the map information. A problem is therefore that a case in which any reference point which is set up beforehand does not match the start point or the end point of an unregistered road correctly occurs, and correct data about an unregistered road cannot be acquired.

The present invention is made in order to solve the above-mentioned problems, and it is therefore an object of the present invention to provide a map information processing apparatus which can acquire correct data about an unregistered road and can add the unregistered road to map information.

DISCLOSURE OF THE INVENTION

In order to solve the above-mentioned problems, a map information processing apparatus in accordance with the present invention includes: a positioning means for measuring a current position; a memory for storing, as running track data, the current position which is acquired in turn through the measurement done by the positioning means; a map data storage means for storing map data including road data about registered roads; a road matching means for comparing a registered road shown by road data read from the map data storage means with the current position measured by the positioning means to carry out map matching; an input unit for inputting both a specified detection start point which is a point at which detection of an unregistered road is to be started, and a specified detection end point which is a point at which the detection is to be ended; an unregistered road detection means to which both the specified detection start point and the specified detection end point of an unregistered road are inputted from the input unit, for detecting, as the unregistered road, a section between a detection start point and a detection end point of the unregistered road which are acquired on a basis of either the map matching carried out by the road matching means or a result of comparison between the running track data read from the memory and road data read from the map data storage means; and a road data generating means for generating road data corresponding to the unregistered road detected by the unregistered road detection means, and then storing the road data in the map data storage means.

In accordance with the present invention, the map information processing apparatus is constructed in such a way as to, when the specified detection start point and specified detection end point of the unregistered road are inputted from the input unit, detect, as the unregistered road, a section between the detection start point and the detection end point of the unregistered road which are acquired on the basis of either the map matching carried out by the road matching means or the result of the comparison between the running track data read from the memory and the road data read from the above-mentioned map data storage means. Therefore, the map information processing apparatus can prevent incorrect matching from being established between the running track data and the road data and can acquire correct data about the unregistered road. As a result, the map information processing apparatus can correctly add the unregistered road to the map information as a registered road.

BRIEF DESCRIPTION OF THE FIGURES

FIG. 6 is a view showing an example of display in a case in which the instruction for starting detection of an unregistered road is provided at a later time in the map information processing apparatus in accordance with Embodiment 1 of the present invention;

FIG. 10 is a view for explaining an operation of performing map matching with a reduced degree of correction which is carried out by the map information processing apparatus in accordance with Embodiment 1 of the present invention;

FIG. 18 is a flow chart showing the details of an unregistered road detection start point setting process carried out in step ST16 of regular processing carried out by a map information processing apparatus in accordance with Embodiment 5 of the present invention; and FIG. 19 is a flow chart showing the details of an unregistered road detection end point setting process carried out in step ST17 of regular processing carried out by a map information processing apparatus in accordance with Embodiment 6 of the present invention.

PREFERRED EMBODIMENTS OF THE INVENTION

Hereafter, in order to explain this invention in greater detail, the preferred embodiments of the present invention which implement the present invention will be described with reference to the accompanying drawings.

Embodiment 1

Figure 1:
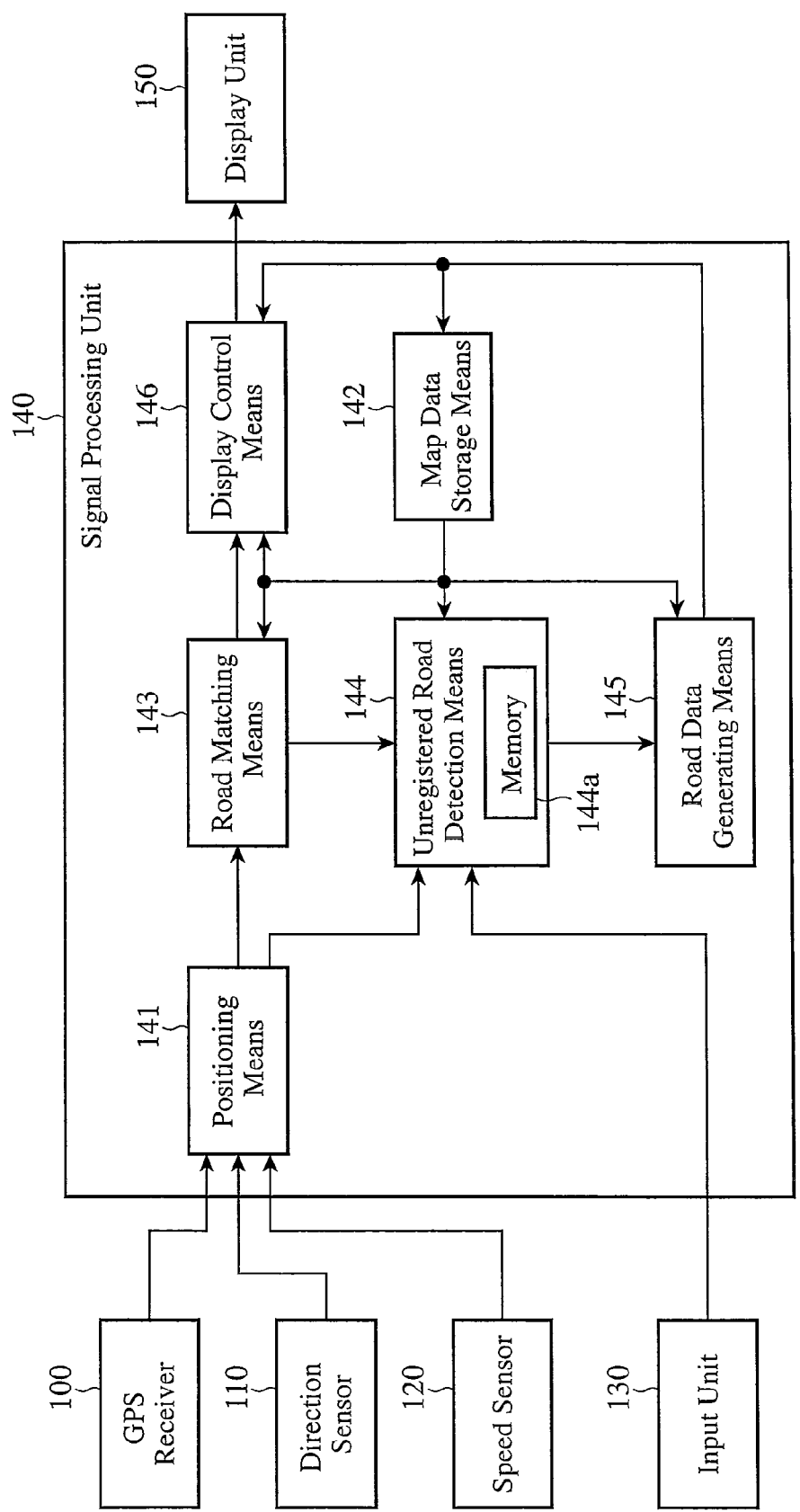
FIG. 1 is a block diagram showing the structure of a navigation apparatus to which a map information processing apparatus is applied in accordance with Embodiment 1 of the present invention.

FIG. 1 is a block diagram showing the structure of a navigation apparatus to which a map information processing apparatus in accordance with Embodiment 1 of the present invention is applied. This navigation apparatus is comprised of a GPS (Global Positioning System) receiver 100, a direction sensor 110, a speed sensor 120, an input unit 130, a signal processing unit 140, and a display unit 150.

The GPS receiver 100 calculates position information, such as the latitude, the longitude, the altitude, and so on of the current position of a vehicle from signals which the GPS receiver acquires by receiving electric waves from satellites (GPS satellites). The position information calculated by this GPS receiver 100 is sent to the signal processing unit 140. The direction sensor 110 is comprised of, for example, a gyro sensor, and detects the running direction of the vehicle. Direction information showing the running direction detected by this direction sensor 110 is sent, as autonomous navigation data, to the signal processing unit 140. The speed sensor 120 is comprised of, for example, a speedometer, a brake detecting unit, and so on, and detects the running speed of the vehicle and a brake state showing whether the brake of the vehicle is in the ON state. Vehicle speed information including the running speed and the brake state which are detected by this speed sensor 120 is sent, as autonomous navigation data, to the signal processing unit 140.

The input unit 130 is comprised of, for example, a remote controller, a touch panel, a voice input unit having a voice recognition function, and so on, and is used in order for the user to input various kinds of data. For example, the input unit 130 is used in order for the user to, when the navigation apparatus detects an unregistered road which is not registered as road data, input an instruction for starting detection of the unregistered road, and an instruction for ending the detection of the unregistered road. The data inputted from this input unit 130 are sent to the signal processing unit 140.

The signal processing unit 140 is comprised of, for example, a computer, and performs a process of detecting and registering an unregistered road, which is a feature of the present invention, in addition to processes of implementing functions required for navigation, such as position detection, route search, and route guide. The details of this signal processing unit 140 will be mentioned below. The display unit 150 is comprised of, for example, a liquid crystal display, and corresponds to a part of a display means of the present invention. This display unit 150 displays a map in which the current position of the vehicle, the route, and so on are shown, various messages, and so on according to display data sent from the signal processing unit 140.

Next, the details of the signal processing unit 140 will be explained. The signal processing unit 140 is comprised of a positioning means 141, a map data storage means 142, a road matching means 143, an unregistered road detection means 144, a road data generating means 145, and a display control means 146. Components included in these components, other than the map data storage means 142, are implemented via a control program stored in a not-shown memory.

The positioning means 141 calculates the current position of the vehicle on the basis of both the position information sent from the GPS receiver 100, and the autonomous navigation data sent from the direction sensor 110 and the speed sensor 120. Current position data showing the current position of the vehicle, which are calculated by this positioning means 141, are sent to the road matching means 143 and the unregistered road detection means 144.

The map data storage means 142 is comprised of, for example, a hard disk drive, a reader for reading data from the hard disk drive, and a writer for writing data into the hard disk drive, and stores map data including road data about registered roads. Map data stored in this map data storage means 143 are read by the road matching means 143, the unregistered road detection means 144, the road data generating means 145, and the display control means 146. Road data generated by the road data generating means 145 are also stored in this map data storage means 142.

The road matching means 143 performs map matching of comparing the current position of the vehicle which is shown by the current position data and which is sent from the positioning means 141 with road data read from the map data storage means 142, and sends the result of this map matching to the unregistered road detection means 144 and the display control means 146.

The unregistered road detection means 144 is provided with a memory 144a. This unregistered road detection means 144 stores, as running track data about the vehicle, the current position data sent from the positioning means 141 in the memory 144a. The unregistered road detection means 144 also detects an unregistered road section (i.e., a detection start point and a detection end point of an unregistered road) whose information is not registered in the map data storage means 142 as road data on the basis of the result of both the map matching sent from the road matching means 143 and the instruction inputted from the input unit 130, and sends this detected unregistered road section to the road data generating means 145.

The road data generating means 145 generates road data about the unregistered road from the unregistered road section which is sent from the unregistered road detection means 144, i.e., from the detection start point and the detection end point of the unregistered road. The road data generated by this road data generating means 145 are sent to the display control means 146 and are displayed, as the unregistered road, on the display unit 150 while the road data are sent to the map data storage means 142 and are stored in this map data storage means 142.

The display control means 146 corresponds to another part of the display means of the present invention, generates display data for displaying roads which are based on the road data read from the map data storage means 141, a message which the display control means has generated according to the result of the map matching sent from the road matching means 143, and the unregistered road shown by the map data sent from the road data generating means 145, and sends the display data to the display unit 150.

Figure 2:
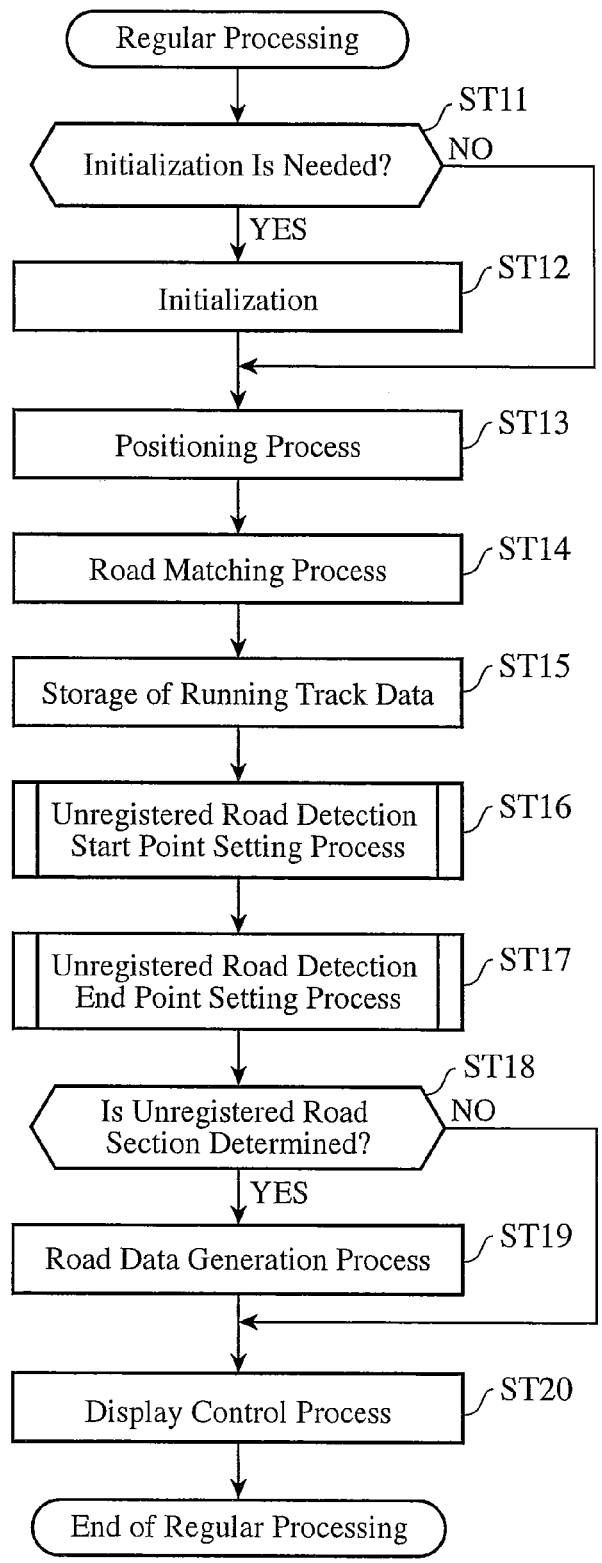
FIG. 2 is a flow chart showing regular processing carried out by the map information processing apparatus in accordance with Embodiment 1 of the present invention.

Next, the operation of the map information processing apparatus in accordance with Embodiment 1 of the present invention which is constructed as mentioned above will be explained. First, regular processing which is carried out under normal operating conditions by the map information processing apparatus in accordance with Embodiment 1 will be explained with reference to a flow chart shown in FIG. 2. This regular processing is carried out at predetermined time intervals by the map information processing apparatus.

In the regular processing, the map information processing apparatus checks to see whether or not it has to perform initialization first (step ST11). For example, the map information processing apparatus judges that it has to perform initialization immediately after the navigation apparatus is powered on. When, in this step ST11, judging that the map information processing apparatus has to perform initialization, the map information processing apparatus performs initialization (step ST12). In contrast, when, in step ST11, judging that the map information processing apparatus does not have to perform initialization, the map information processing apparatus skips the process of step ST12.

The map information processing apparatus then carries out a positioning process (step ST13). More specifically, the positioning means 141 calculates the current position of the vehicle on the basis of both the position information sent from the GPS receiver 100, and the autonomous navigation data sent from the direction sensor 110 and the speed sensor 120, and sends, as current position data, the current position of the vehicle to the road matching means 143 and the unregistered road detection means 144. The map information processing apparatus then carries out a road matching process (step ST14). More specifically, the road matching means 143 compares the current position data sent from the positioning means 141 with the road data read from the map data storage means 142, performs map matching, and sends the result of this map matching, i.e., data showing whether or not matching between the current position data and the road data is established to the unregistered road detection means 144 and the display control means 146.

The map information processing apparatus then stores the running track data about the vehicle (step ST15). More specifically, the unregistered road detection means 144 stores, as the running track data about the vehicle, the current position data sent from the positioning means 141 in the memory 144a. The map information processing apparatus then carries out an unregistered road detection start point setting process (step ST16). More specifically, the unregistered road detection means 144 detects the detection start point of an unregistered road, and sends this detection result to the road data generating means 145. The details of this unregistered road detection start point setting process will be mentioned below.

The map information processing apparatus then carries out an unregistered road detection end point setting process (step ST17). More specifically, the unregistered road detection means 144 detects the detection end point of the unregistered road, and sends this detection result to the road data generating means 145. The details of this unregistered road detection end point setting process will be mentioned below. The map information processing apparatus then checks to see whether or not the unregistered road section has been determined (step ST18). More specifically, the map information processing apparatus checks to see whether the map information processing apparatus has acquired both the detection start point and the detection end point of the unregistered road. When, in this step ST18, judging that the unregistered road section has been determined, the map information processing apparatus carries out a road data generation process (step ST19). More specifically, the road data generating means 145 generates road data about the unregistered road from the detection start point and the detection end point of the unregistered road which are sent from the unregistered road detection means 144, and sends the road data to the display control means 146 while sending the road data to the map data storage means 142 so as to store the road data in this map data storage means 142. When, in step ST18, judging that the unregistered road section has not been determined, the map information processing apparatus skips the process of step ST19.

The map information processing apparatus then carries out a display control process (step ST20). More specifically, when the road data generating means 145 has ended in success of the generation of the road data about the unregistered road, i.e., when the road data are sent thereto from the road data generating means 145, the display control means 146 generates display data for displaying a telop showing that the road data generating means has ended in success of the generation of the road data about the unregistered road and sends the display data to the display unit 150 while generating display data for displaying the unregistered road based on the road data received from the road data generating means 145 and sending the display data to the display unit 150. As a result, by looking at the display unit 150, the user can know that the unregistered road has been registered, and the registered unregistered road. The map information processing apparatus can be constructed in such a way as to notify the user that the unregistered road has been registered into the map information processing apparatus by using, for example, a voice, in addition to the display of the telop. After carrying out the above-mentioned processes, the map information processing apparatus ends the regular processing.

Next, the details of the unregistered road detection start point setting process performed in step ST16 of the regular processing will be explained with reference to a flow chart shown in FIG. 3. This unregistered road detection start point setting process is carried out by the unregistered road detection means 144.

In the unregistered road detection start point setting process, the unregistered road detection means checks to see whether or not a detection start point has been set up first (step ST21). In this step ST21, when judging that a detection start point has been set up, the unregistered road detection means ends the unregistered road detection start point setting process. In contrast, when, in step ST21, judging that no detection start point has been set up, the unregistered road detection means checks to see whether or not a departing point at which the vehicle has departed from a registered road is being held (step ST22). More specifically, the unregistered road detection means 144 checks to see whether or not data showing a departing point are stored in the memory 144*a*. When, in this step ST22, judging that a departing point at which the vehicle has departed from a registered road is being held, the unregistered road detection means advances the sequence to step ST25.

In contrast, when, in step ST22, judging that no departing point at which the vehicle has departed from a registered road is being held, the unregistered road detection means then checks to see whether the vehicle has departed from a registered road (step ST23). More specifically, the unregistered road detection means 144 checks to see whether the result of the map matching sent from the road matching means 143 shows that no matching is established, or checks to see whether the road shown by the running track data read from the memory 144*a* has departed from any registered road shown by the road data read from the map data storage means 142. When, in this step ST23, judging that the road has not departed from any registered road, the unregistered road detection means ends the unregistered road detection start point setting process. In contrast, when, in step ST23, judging that the road has departed from any registered road, the unregistered road detection means holds the departing point at which the vehicle has departed from any registered road (step ST24). More specifically, the unregistered road detection means 144 stores data showing the departing point in the memory 144*a*. After that, the unregistered road detection means advances the sequence to step ST25.

The unregistered road detection means, in step ST25, checks to see whether an instruction for starting detection has been issued. More specifically, the unregistered road detection means 144 checks to see whether an instruction for setting up a detection start point has been sent thereto from the input unit 130 before the vehicle starts running or during the vehicle runs. When, in this step ST25, judging that no instruction for starting detection has been issued, the unregistered road detection means ends the unregistered road detection start point setting process.

In contrast, when, in this step ST25, judging that an instruction for starting detection start has been issued, the unregistered road detection means checks to see whether the vehicle has passed through a point which is specified as the detection start point (a specified detection start point) (step ST26). Concretely, the unregistered road detection means 144 checks to see whether the current position has passed through the detection start point by comparing the current position data sent from the positioning means 141 with the specified detection start point inputted from the input unit 130.

When, in this step ST26, judging that the vehicle has passed through the specified detection start point, the unregistered road detection means defines the departing point stored in the memory 144*a* as the detection start point (step ST27). After that, the unregistered road detection means ends the unregistered road detection start point setting process. In contrast, when, in step ST26, judging that the vehicle has not passed through the specified detection start point yet, the unregistered road detection means ends the unregistered road detection start point setting process without defining the departing point as the detection start point.

Figure 4:
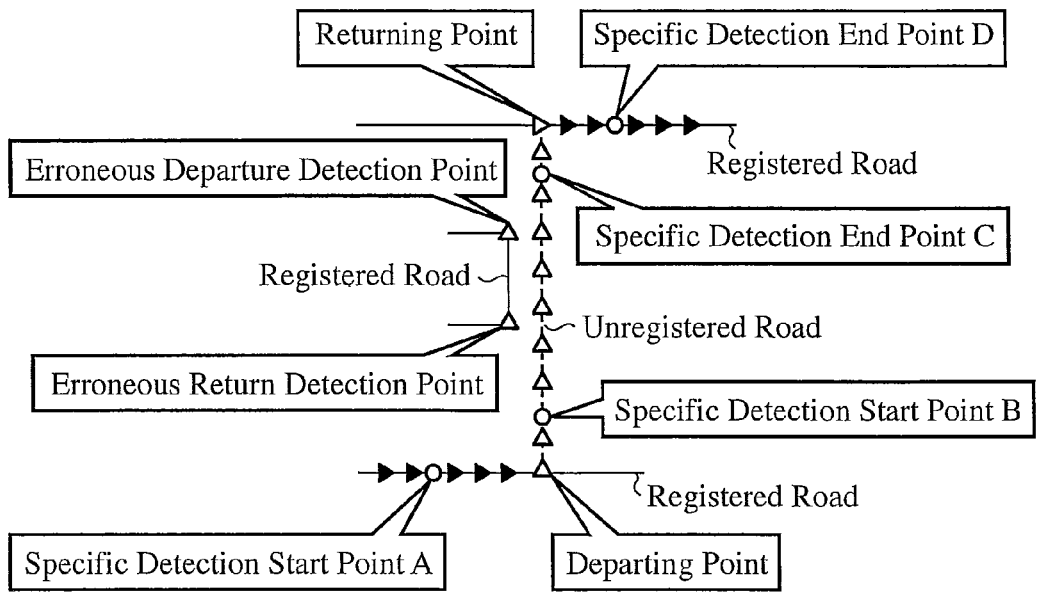
FIG. 4 is an explanatory drawing for explaining the operation of the map information processing apparatus in accordance with Embodiment 1 of the present invention.

As shown in FIG. 4, there can be a case in which either a specific detection start point A located before the departing point or a specific detection start point B located behind the departing point is specified as the specified detection start point through the user's manipulation of the input unit 130 before the vehicle starts running or during the vehicle runs. In FIG. 4, a triangular mark shows the vehicle, a solid triangular mark shows that the vehicle is located on a registered road, and an open triangular mark shows that the vehicle is located on an unregistered road, the departing point, or a returning point. The same goes for the drawings shown below.

Figure 5:
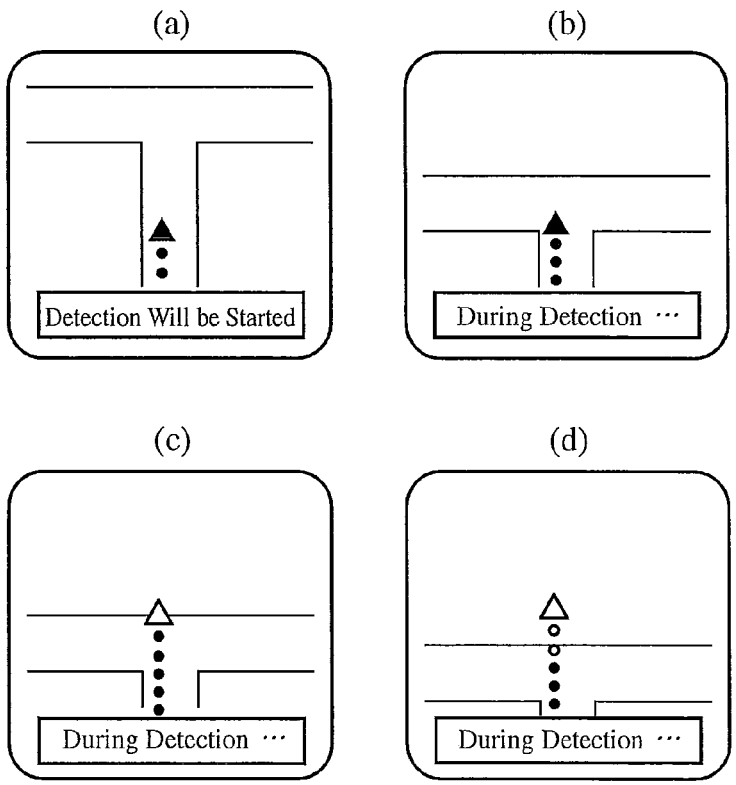
FIG. 5 is a view showing an example of display in a case in which an instruction for starting detection of an unregistered road is provided at an earlier time in the map information processing apparatus in accordance with Embodiment 1 of the present invention.

In the case in which the specific detection start point A is specified, the vehicle position and roads are displayed together with a message of "Detection will be started" on the display unit 150 immediately after the specification, as shown in FIG. 5(*a*), and, after that, as shown in FIGS. 5(*b*) to 5(*d*), the position of the vehicle is displayed together with a message of "During detection" according to the vehicle's running while the vehicle position is updated with time. FIG. 5(*b*) shows a display which is produced before the vehicle has departed from any registered roads, FIG. 5(*c*) shows a display which is produced when the vehicle reaches the departing point, and FIG. 5(d) shows a display which is produced when the vehicle has departed from any registered roads and is running along the unregistered road.

Figure 3:
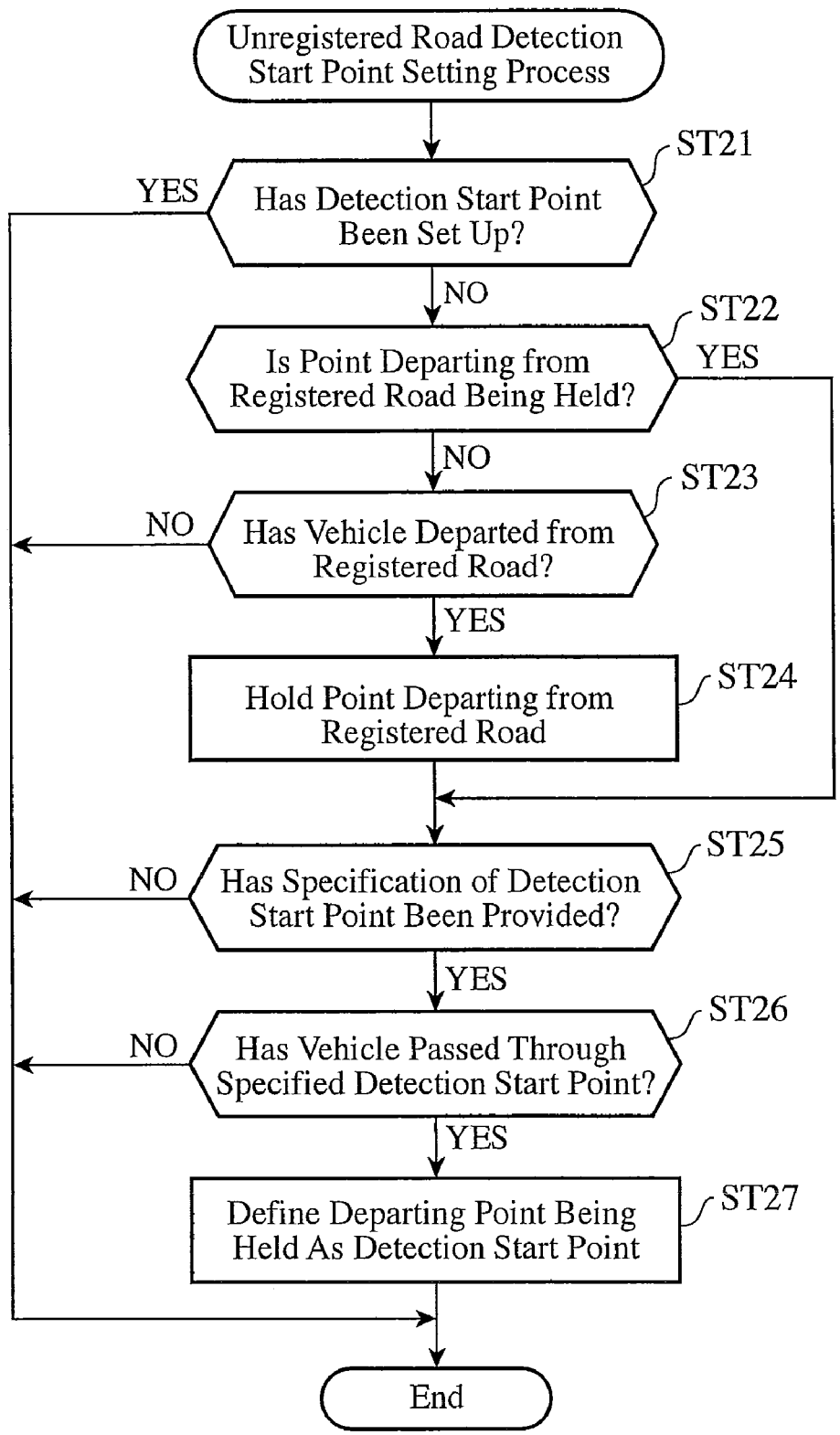
FIG. 3 is a flow chart showing the details of an unregistered road detection start point setting process carried out in step ST16 of the regular processing shown in FIG. 2.

In the case in which the specific detection start point A is specified, when holding the departing point at which the vehicle has departed from any registered roads through the process shown in the flow chart of FIG. 3 after the vehicle has passed through the specific detection start point A, the unregistered road detection means defines the departing point as the detection start point. More specifically, even if the detection start point specified according to the user's manipulation is a point, like the specific detection start point A, which is located before the point at which the vehicle has actually departed from any registered roads, the unregistered road detection means sets up the detection start point of the unregistered road after the vehicle reaches the actual departing point without setting up the detection start point of the unregistered road until the vehicle departs from any registered roads.

In contrast, when the specific detection start point B is specified, as shown in FIGS. 6(a) to 6(c), the position of the vehicle is displayed on the display unit 150 according to the vehicle's running while the vehicle position is updated with time, and, after that, when the specific detection start point B is specified, roads are displayed together with a message of "Detection will be started." FIG. 6(a) shows a display which is produced before the vehicle has departed from any registered roads, FIG. 6(b) shows a display which is produced when the vehicle reaches the departing point, FIG. 6(c) shows a display which is produced when the vehicle has departed from any registered roads and is running along the unregistered road, and FIG. 6(d) shows a display which is produced when the specific detection start point B is specified.

In the case in which the specific detection start point B is specified, through the process shown in the flow chart of FIG. 3, the unregistered road detection means defines the departing point stored in the memory 144a as the detection start point when the vehicle passes through the specific detection start point B. More specifically, even if the detection start point specified according to the user's manipulation is a point, like the specific detection start point B, which is located behind the point at which the vehicle has actually departed from any registered roads, since the unregistered road detection means holds the departing point at which the vehicle has actually departed from any registered roads, the unregistered road detection means can define the actual departing point as the detection start point used for the detection of the unregistered road.

Although the input data which are input by the user before the vehicle starts running or during the vehicle runs is the detection start point, a road at which the detection of an unregistered road is started can be alternatively input.

Next, the details of the unregistered road detection end point setting process performed in step ST17 of the regular processing will be explained with reference to a flow chart shown in FIG. 7. This unregistered road detection end point setting process is performed by the unregistered road detection means 144.

In the unregistered road detection end point setting process, the unregistered road detection means checks to see whether or not a detection end point has been set up first (step ST31). In this step ST31, when judging that no detection start point has been set up, the unregistered road detection means ends the unregistered road detection end point setting process. In contrast, when, in step ST31, judging that a detection end point has been set up, the unregistered road detection means then checks to see whether or not a returning point at which the vehicle has returned to a registered road is being held (step ST32). More specifically, the unregistered road detection means 144 checks to see whether or not data showing a returning point is stored in the memory 144a. When, in this step ST32, judging that a returning point at which the vehicle has returned to a registered road is being held, the unregistered road detection means advances the sequence to step ST35.

In contrast, when, in step ST32, judging that no returning point at which the vehicle has returned to a registered road is being held, the unregistered road detection means then checks to see whether the vehicle has returned to a registered road (step ST33). More specifically, the unregistered road detection means 144 checks to see whether the result of the map matching sent from the road matching means 143 shows that matching has been established, or checks to see whether the vehicle running along the road shown by the running track data read from the memory 144a has returned to a registered road shown by the road data read from the map data storage means 142. When, in this step ST33, judging that the vehicle has not returned to any registered road, the unregistered road detection means ends the unregistered road detection end point setting process. In contrast, when, in step ST33, judging that the vehicle has returned to a registered road, the unregistered road detection means holds the returning point at which the vehicle has returned to the registered road (step ST34). More specifically, the unregistered road detection means 144 stores data showing the returning point in the memory 144a. After that, the unregistered road detection means advances the sequence to step ST35.

The unregistered road detection means, in step ST35, checks to see whether an instruction for ending the detection has been issued. More specifically, the unregistered road detection means 144 checks to see whether an instruction for setting up a detection end point has been sent thereto from the input unit 130 before the vehicle starts running or during the vehicle runs. When, in this step ST35, judging that an instruction for ending the detection has been issued, the unregistered road detection means then checks to see whether the vehicle has passed through a point which is specified as the detection end point (a specified detection endpoint) (step ST36). Concretely, the unregistered road detection means 144 checks to see whether the current position has passed through the specified detection end point by comparing the current position data sent from the positioning means 141 with the specified detection end point inputted from the input unit 130.

When, in this step ST36, judging that the vehicle has passed through the specified detection end point, the unregistered road detection means defines the returning point stored in the memory 144a as the detection endpoint (step ST37). After that, the unregistered road detection means ends the unregistered road detection end point setting process. In contrast, when, in step ST36, judging that the vehicle has not passed through the specified detection end point yet, the unregistered road detection means ends the unregistered road detection end point setting process without defining the returning point as the detection end point.

When, in above-mentioned step ST35, judging that no detection end point has been specified, the unregistered road detection means then check to see whether the vehicle has departed from a registered road again (step ST38). More specifically, the unregistered road detection means 144 checks to see whether the current position of the vehicle has departed from a registered road again by comparing the current position data sent from the positioning means 141 with the road data read from the map data storage means 142.

When, in this step ST38, judging that the current position of the vehicle has not departed from a registered road again, the unregistered road detection means ends the unregistered road detection end point setting process. In contrast, when, in step ST38, judging that the current position of the vehicle has departed from a registered road again, the unregistered road detection means discards the returning point currently held by the memory 144a (step ST39). After that, the unregistered road detection means ends the unregistered road detection end point setting process.

As shown in FIG. 4, there can be a case in which either a specific detection end point C located before the returning point or a specific detection start point D located behind the returning point is specified as the specified detection end point through the user's manipulation of the input unit 130 before the vehicle starts running or during the vehicle runs.

Figure 8:
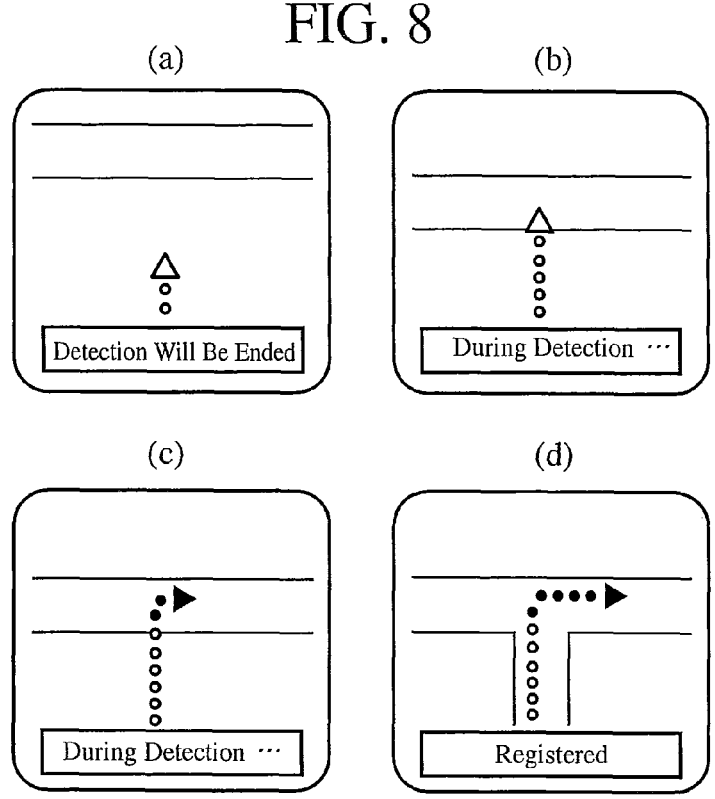
FIG. 8 is a view showing an example of display in a case in which an instruction for ending detection of an unregistered road is provided at an earlier time in the map information processing apparatus in accordance with Embodiment 1 of the present invention.

In the case in which the specific detection end point C is specified, the vehicle mark is displayed together with a message of "Detection will be ended" on the display unit 150 immediately after the specification, as shown in FIG. 8(a), and, after that, as shown in FIGS. 8(b) and 8(c), the position of the vehicle is displayed together with a message of "Detection is being ended" according to the vehicle's running while the vehicle position is updated with time. FIG. 8(b) shows a display which is produced when the vehicle reaches the returning point at which the vehicle returns to a registered road, and FIG. 8(c) shows a display which is produced when the vehicle has passed through the returning point and is running along the registered road. When registration of the unregistered road is then completed, a message of "Registered" is displayed, as shown in FIG. 8(d).

Figure 7:
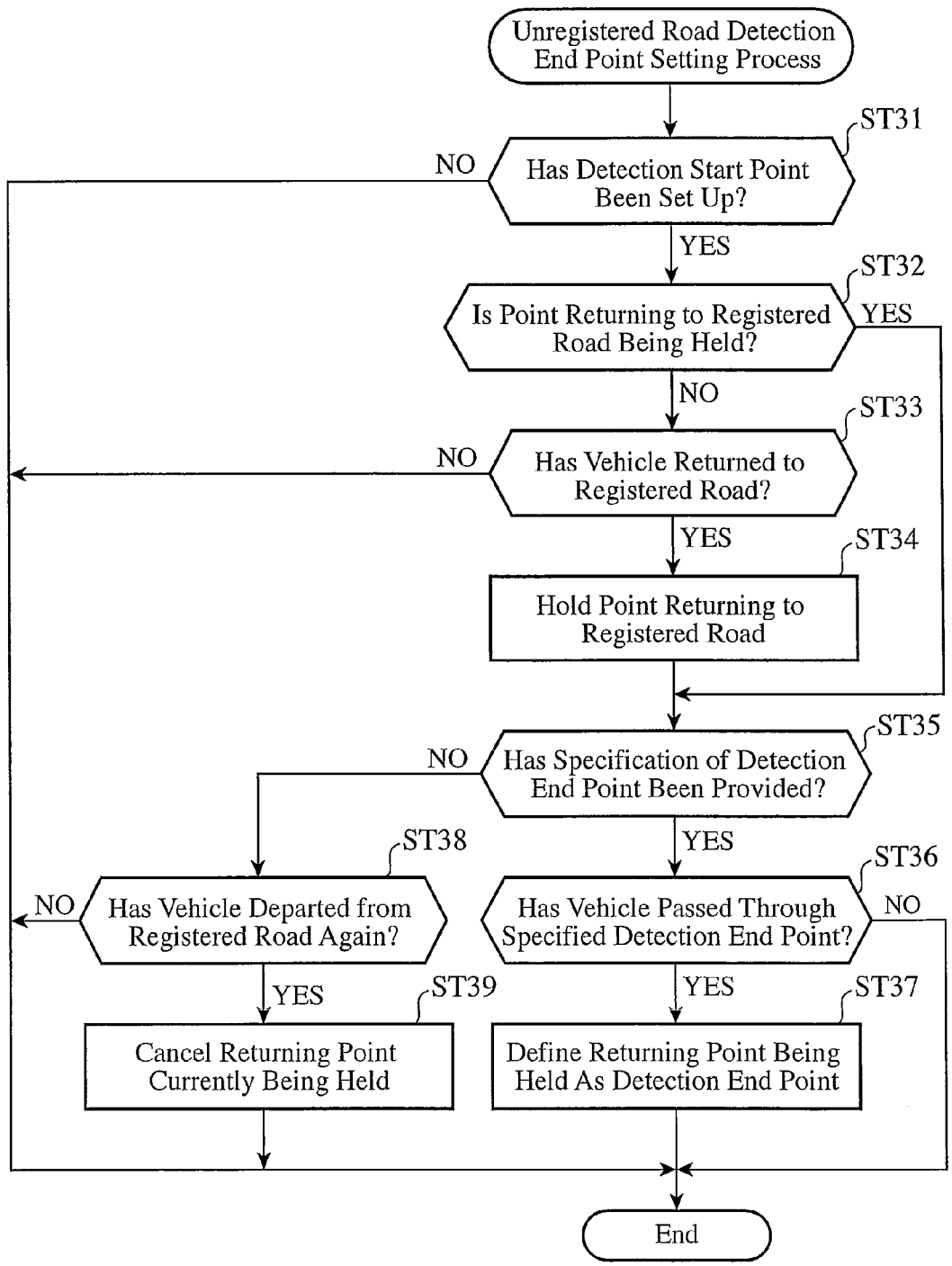
FIG. 7 is a flow chart showing the details of an unregistered road detection end point setting process carried out in step ST17 of the regular processing shown in FIG. 2.

In the case in which the specific detection end point C is specified, when holding the returning point at which the vehicle has returned to the registered road through the process shown in the flow chart of FIG. 7 after the vehicle has passed through the specific detection end point C, the unregistered road detection means defines the returning point as the detection end point. More specifically, even if the detection end point specified according to the user's manipulation is a point, like the specific detection endpoint C, which is located before the point at which the vehicle has actually returned to a registered road, the unregistered road detection means sets up the detection end point of the unregistered road after the vehicle reaches the actual returning point without setting up the detection end point of the unregistered road until the vehicle returns to the registered road.

Figure 9:
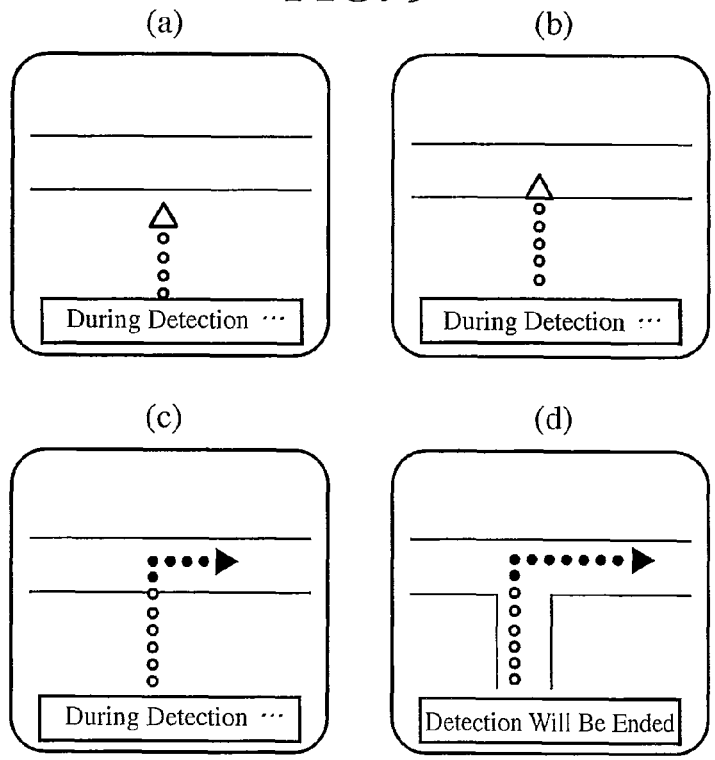
FIG. 9 is a view showing an example of display in a case in which the instruction for ending detection of an unregistered road is provided at a later time in the map information processing apparatus in accordance with Embodiment 1 of the present invention.

In contrast, in the case in which the specific detection end point D is specified, as shown in FIGS. 9(a) to 9(c), the position of the vehicle is displayed on the display unit 150 according to the vehicle's running while the vehicle position is updated with time, and, after that, when the specific detection endpoint D is specified, roads are displayed together with a message of "Detection will be ended." FIG. 9(a) shows a display which is produced before the vehicle returns to a registered road, FIG. 9(b) shows a display which is produced when the vehicle reaches the returning point, FIG. 9(c) shows a display which is produced when the vehicle has returned to a registered road and is running along the registered road, and FIG. 9(d) shows a display which is produced when the specific detection end point D is specified. In the case in which the specific detection end point D is specified, a message of "Detection will be ended" is displayed on the display unit 150.

In the case in which the specific detection end point D is specified, through the process shown in the flow chart of FIG. 7, the unregistered road detection means defines the returning point stored in the memory 144a as the detection end point when the vehicle passes through the specific detection endpoint D. More specifically, even if the detection endpoint specified according to the user's manipulation is a point, like the specific detection end point D, which is located behind the point at which the vehicle has actually returned to a registered road, since the unregistered road detection means holds the returning point at which the vehicle has actually returned to the registered road, the unregistered road detection means can define the actual returning point as the detection end point of the unregistered road.

Although the input data which are input by the user before the vehicle starts running or during the vehicle runs is the detection end point, a road at which the detection of an unregistered road is ended can be alternatively input.

The road matching means 143 can be alternatively constructed in such a way as to, when detecting a departing point at which the vehicle has departed from a registered road and a returning point at which the vehicle has returned to a registered road, perform map matching while reducing the degree of correction of the map matching. More specifically, the navigation apparatus generally performs a map matching process of comparing the current position of the vehicle measured by the positioning means 141 with registered roads shown by the road data read from the map data storage means 142 so as to correct the vehicle position, and displays this corrected vehicle position on the display unit 150. As a result, even if the vehicle position deviates from any of the registered roads, the navigation apparatus corrects the vehicle position in such a way as to display the vehicle position on one of the registered roads.

The correction of the vehicle position through such the map matching processing can cause a case in which the navigation apparatus assumes that the vehicle is running along a neighboring registered road even if the vehicle is actually running along an unregistered road. Therefore, when the departing point at which the vehicle has departed from a registered road and the returning point at which the vehicle has returned to a registered road which are corrected through the map matching processing are used for the judgment of the detection start point and the detection end point of an unregistered road, there may be a case in which matching is established between the vehicle position and a registered road running in parallel with the unregistered road in the vicinity of each of the departing point and the returning point, and the departing point and the returning point are then detected erroneously, as shown in FIG. 10(a). Furthermore, errors resulting from GPS and so on are included in the current position data acquired from the positioning means 141. It is therefore difficult to detect the departing point at which the vehicle has departed from a registered road and the returning point at which the vehicle has returned to a registered road by using only the vehicle position data acquired from the positioning means 141 without performing the map matching processing.

To solve this problem, the road matching means 143 can be constructed in such a way as to, when detecting the departing point at which the vehicle has departed from a registered road and the returning point at which the vehicle has returned to a registered road, instead of performing the general map matching processing for displaying the vehicle position, perform map matching processing with a reduced degree of correction, and detect the departing point at which the vehicle has departed from a registered road and the returning point at which the vehicle has returned to a registered road from the vehicle position acquired through this map matching processing. In this case, the map matching processing with a reduced degree of correction can be implemented by, for example, making a criterion distance between an unregistered road and a registered road by which to judge whether or not matching is established between them be smaller than that in the case of the general map matching processing.

As a result, because it is difficult for the navigation apparatus to, even if the vehicle is running along an unregistered road, establish matching between the vehicle position and a registered road running in parallel with the unregistered road in the vicinity of each of the departing point and the returning point, as shown in FIG. 10(b), the navigation apparatus can detect the departing point and the returning point correctly. As a result, the accuracy of detecting the position of the departing point at which the vehicle has departed from a registered road, and that of the returning point at which the vehicle has returned to a registered road can be improved. Furthermore, incorrect matching between the vehicle position and a registered road running in parallel with the unregistered road can be prevented.

The road matching means 143 can be constructed in such a way as to perform the general map matching processing in order to produce a screen display on the display unit 150 in parallel with the map matching processing having a reduced degree of correction for detecting both the departing point at which the vehicle has departed from a registered road, and the returning point at which the vehicle has returned to a registered road. The result of this general map matching processing is sent to the display control means 146, and is used in order to display the current position of the vehicle on the display unit 150.

Furthermore, the unregistered road detection means 144 can be constructed in such a way as to, when a registered road exists between the detection start point and the detection end point of the unregistered road, detect, as unregistered roads, a section extending from the detection start point to the start point of the registered road, and a section extending from the end point of the registered road to the detection end point, or detect, as an unregistered road, a section including a registered road and extending from the detection start point to the detection end point according to an instruction inputted from the input unit 130.

In addition, the unregistered road detection means 144 can be constructed in such a way as to, after the specified detection start point is inputted from the input unit 130, cancel the detection of an unregistered road according to a cancellation instruction inputted from the input unit 130.

Furthermore, the navigation apparatus can be constructed in such a way as to accept at least one of a registered road connected to the detection start point of an unregistered road and a registered road connected to the detection end point of the unregistered road from the input unit 130 before the vehicle starts running.

After the detection start point of an unregistered road is set up, there is a possibility that, as shown in FIG. 4, incorrect matching is established between the vehicle position and a road running in parallel with the unregistered road, and an erroneous connection to the registered road which does not meet the user's intention is then established. However, when no specified detection end point is inputted by the input unit 130, even if the above-mentioned map information processing apparatus establishes incorrect matching between the vehicle position and a road running in parallel with the unregistered road and holds the returning point, the map information processing apparatus discards the returning point currently being held if the map information processing apparatus detects a departure of the vehicle from any registered roads, and does not set up the detection end point of an unregistered road until the vehicle reaches the specified detection end point which is inputted by the input unit 130. Therefore, the map information processing apparatus does not detect any unregistered road which does not meet the user's intention.

Embodiment 2

A map information processing apparatus in accordance with Embodiment 2 of the present invention is constructed in such a way as to end detection of the detection start point of an unregistered road when no departure from any registered road has been detected during running over a predetermined distance or more or during a predetermined time period or more.

The structure of the map information processing apparatus in accordance with this Embodiment 2 is the same as that of the map information processing apparatus in accordance with Embodiment 1.

Next, the operation of the map information processing apparatus in accordance with Embodiment 2 of the present invention will be explained. Regular processing which is performed under normal operating conditions by the map information processing apparatus in accordance with Embodiment 2 is fundamentally the same as that of the map information processing apparatus in accordance with Embodiment 1 shown in the flow chart of FIG. 2, and the description of an unregistered road detection start point setting process performed in step ST16 by the map information processing apparatus in accordance with Embodiment 2 differs from that of the map information processing apparatus in accordance with Embodiment 1. Hereafter, the regular processing of the map information processing apparatus in accordance with this embodiment will be explained focusing on the point different from Embodiment 1.

Figure 11:
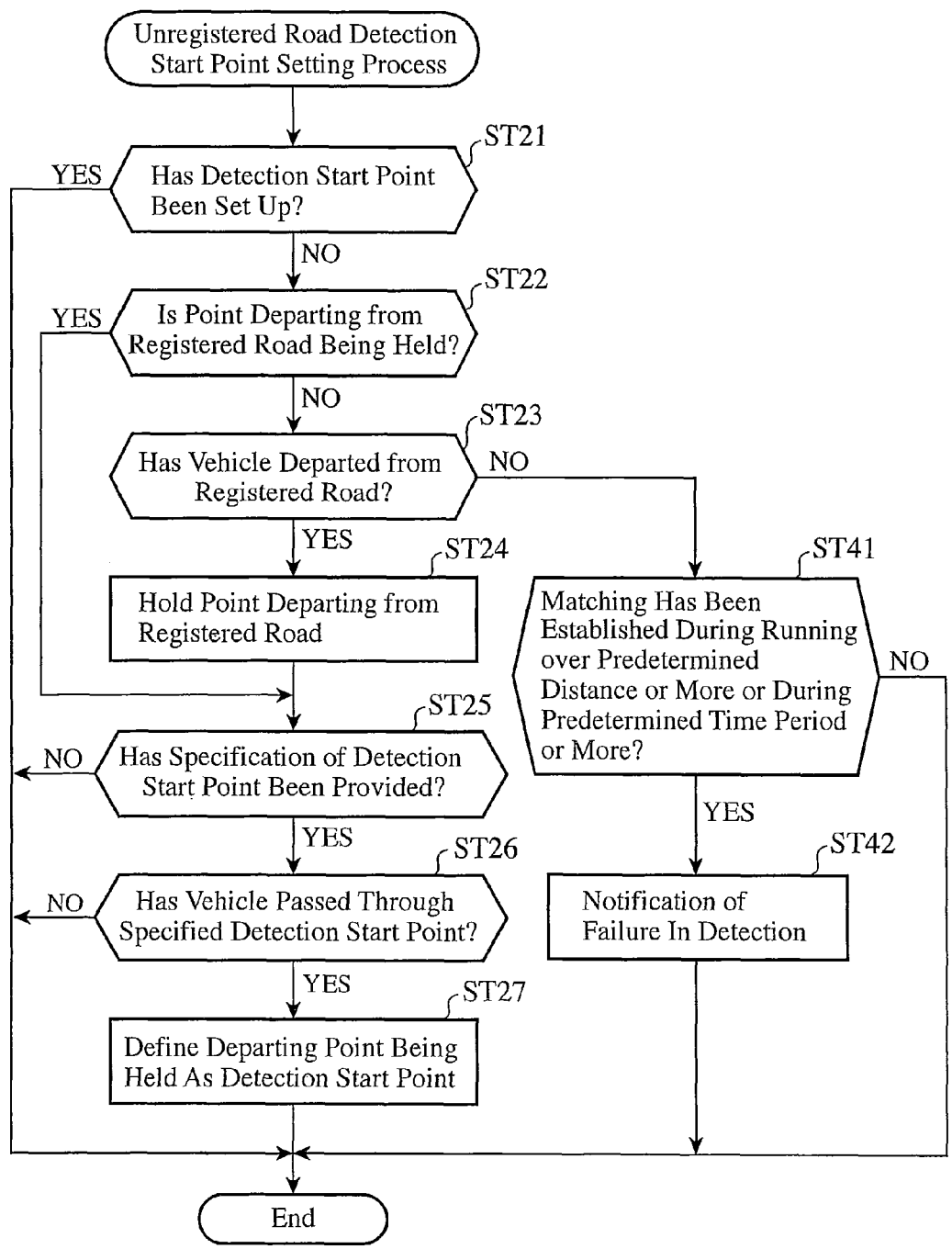
FIG. 11 is a flow chart showing the details of an unregistered road detection start point setting process carried out in step ST16 of regular processing of a map display device in accordance with Embodiment 2 of the present invention.

FIG. 11 is a flow chart showing the details of the unregistered road detection start point setting process performed in step ST16 of the regular processing. In this unregistered road detection start point setting process, steps ST41 and ST42 are added to the unregistered road detection start point setting process in accordance with Embodiment 1 shown in FIG. 3. The same steps as those of the process shown in the flow chart of FIG. 3 are designated by the same reference characters as those used in FIG. 3, and the explanation of the steps will be omitted hereafter.

More specifically, when, in step ST23, judging that the vehicle has not departed from any registered road, the unregistered road detection means checks to see whether or not matching has been established during running over a predetermined distance or more or during a predetermined time period or more (step ST41). In other words, the unregistered road detection means 144 checks to see whether the result of the map matching sent from the road matching means 143 shows that matching has been established during running over the predetermined distance or more or during the predetermined time period or more, or checks to see whether a state in which the vehicle running along the road shown by the running track data read from the memory 144a does not depart from a registered road shown by the road data read from the map data storage means 142 has continued during running over the predetermined distance or more or during the predetermined time period or more.

When, in this step ST41, judging that no matching has been established during running over the predetermined distance or more or during the predetermined time period or more, the unregistered road detection means ends the unregistered road detection start point setting process. In contrast, when, in this step ST41, judging that matching has been established during running over the predetermined distance or more or during the predetermined time period or more, the unregistered road detection means 144 recognizes that the vehicle has not entered to any unregistered road and then notifies failure in the detection of an unregistered road (step ST42). More specifically, the display control means 146 generates a message showing the failure in the detection of an unregistered road and sends, as display data, the message to the display unit 150 according to an instruction from the unregistered road detection means 144. After that, the unregistered road detection means ends the unregistered road detection start point setting process, and the detection of an unregistered road automatically ends.

Figure 12:
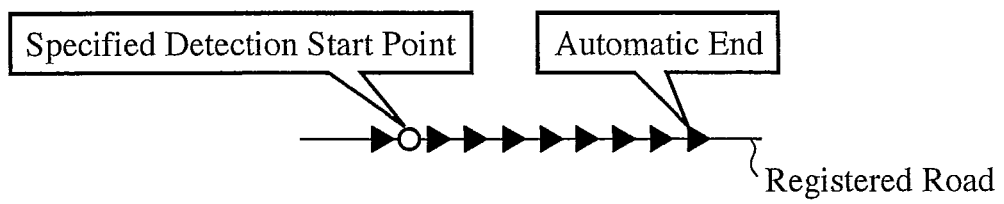
FIG. 12 is an explanatory drawing for explaining the operation of a map information processing apparatus in accordance with Embodiment 2 of the present invention.

Through the above-mentioned processing, when matching continues during running over the predetermined distance or more or during the predetermined time period or more after the user has specified a specific detection start point by manipulating the input unit 130 before the vehicle starts running or during the vehicle runs, as shown in FIG. 12, the detection of an unregistered road automatically ends.

Figure 13:
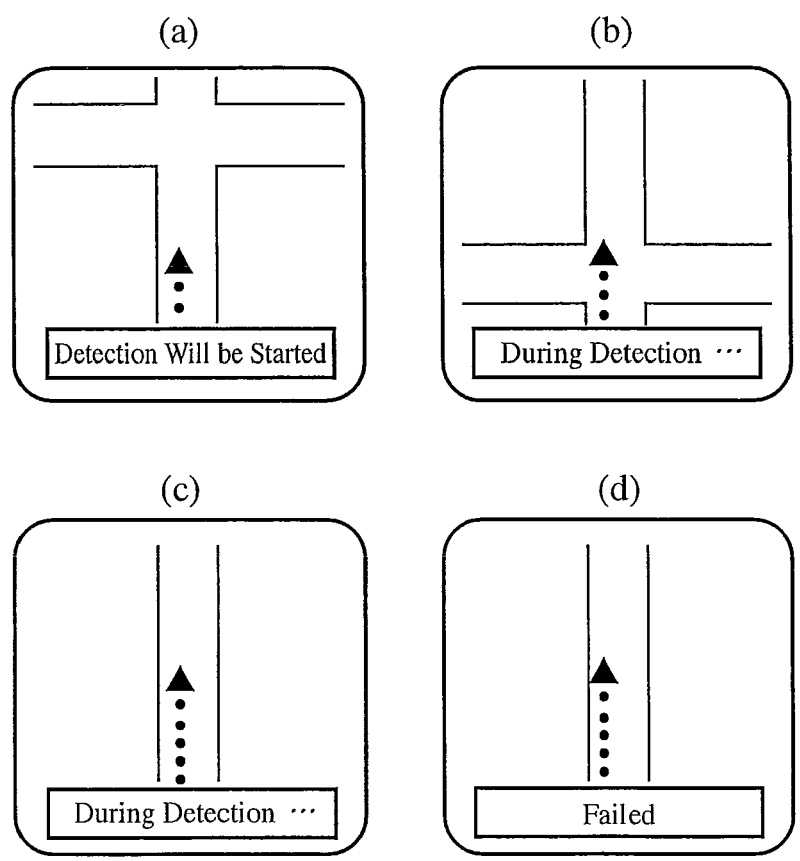
FIG. 13 is a view showing an example of display in a case in which detection of an unregistered road is started in the map information processing apparatus in accordance with Embodiment 2 of the present invention.

In the case in which a specific detection start point is specified, the vehicle position and roads are displayed together with a message of "Detection will be started" on the display unit 150 immediately after the specification, as shown in FIG. 13(*a*), and, after that, as shown in FIGS. 13(*b*) and 13(*c*), the position of the vehicle is displayed together with a message of "During detection" according to the running of the vehicle while the vehicle position is updated with time. Then, when a state in which the vehicle does not depart from any registered road has continued during running over the predetermined distance or more or during the predetermined time period or more, the map information processing apparatus displays a message of "Detection has ended in failure" and ends the process of detecting an unregistered road, as shown in FIG. 13(*d*).

Embodiment 3

A map information processing apparatus in accordance with Embodiment 3 of the present invention ends detection of the detection end point of an unregistered road even if the user does not provide an instruction for ending the detection therefor when the vehicle runs over a predetermined distance or more or during a predetermined time interval or more after the vehicle has returned to a registered road.

The structure of the map information processing apparatus in accordance with this Embodiment 3 is the same as that of the map information processing apparatus in accordance with Embodiment 1.

Next, the operation of the map information processing apparatus in accordance with Embodiment 3 of the present invention will be explained. Regular processing which is performed under normal operating conditions by the map information processing apparatus in accordance with Embodiment 3 is fundamentally the same as that of the map information processing apparatus in accordance with Embodiment 1 shown in the flow chart of FIG. 2, and the description of an unregistered road detection end point setting process performed in step ST17 by the map information processing apparatus in accordance with Embodiment 3 differs from that of the map information processing apparatus in accordance with Embodiment 1. Hereafter, the regular processing of the map information processing apparatus in accordance with this embodiment will be explained focusing on the point different from Embodiment 1.

Figure 14:
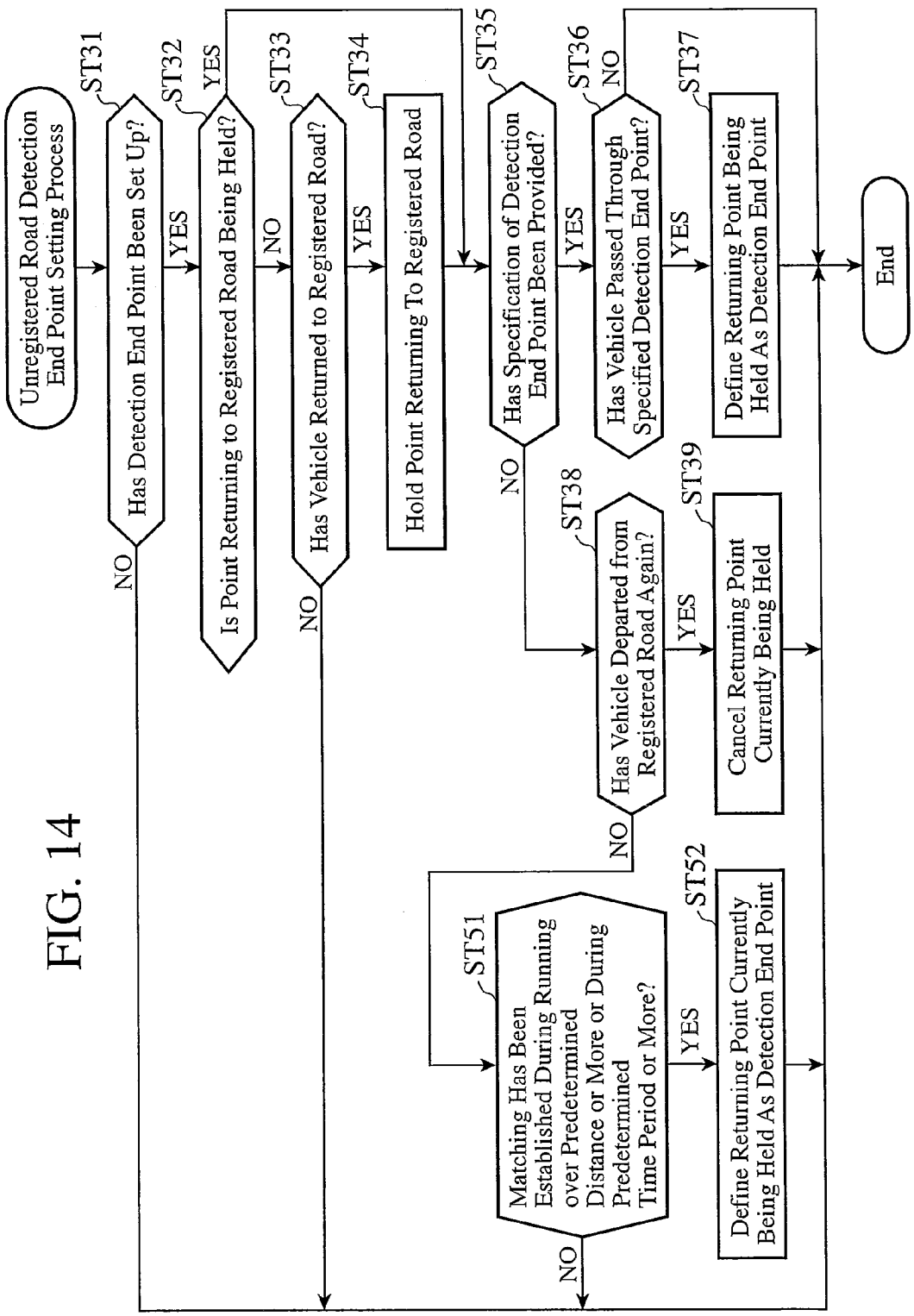
FIG. 14 is a flow chart showing the details of an unregistered road detection end point setting process carried out in step ST17 of regular processing of a map display device in accordance with Embodiment 3 of the present invention.

FIG. 14 is a flow chart showing the details of the unregistered road detection end point setting process performed in step ST17 of the regular processing. In this unregistered road detection end point setting process, steps ST51 and ST52 are added to the unregistered road detection end point setting process in accordance with Embodiment 1 shown in FIG. 7. The same steps as those of the process shown in the flow chart of FIG. 7 are designated by the same reference characters as those used in FIG. 7, and the explanation of the steps will be omitted hereafter.

More specifically, when, in step ST38, judging that the vehicle has not departed from any registered road again, the unregistered road detection means checks to see whether or not matching has been established during running over a predetermined distance or more or during a predetermined time period or more (step ST51). In other words, the unregistered road detection means 144 checks to see whether the result of the map matching sent from the road matching means 143 shows that matching has been established during running over the predetermined distance or more or during the predetermined time period or more, or checks to see whether a state in which the vehicle running along the road shown by the running track data read from the memory 144*a* does not depart from a registered road shown by the road data read from the map data storage means 142 has continued during running over the predetermined distance or more or during the predetermined time period or more.

When, in this step ST51, judging that no matching has been established during running over the predetermined distance or more or during the predetermined time period or more, the unregistered road detection means ends the unregistered road detection endpoint setting process. In contrast, when, in this step ST51, judging that matching has been established during running over the predetermined distance or more or during the predetermined time period or more, the unregistered road detection means 144 recognizes that the vehicle has not departed from any registered road and then defines the returning point stored in the memory 144*a* as the detection endpoint (step ST52). After that, the unregistered road detection means ends the unregistered road detection end point setting process, and the detection of an unregistered road automatically ends.

Figure 15:
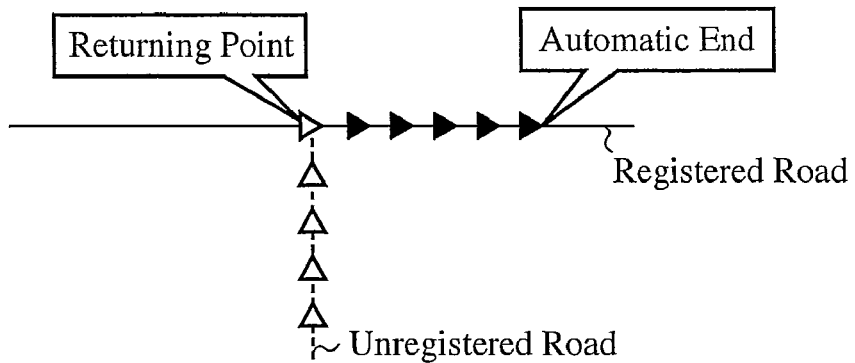
FIG. 15 is an explanatory drawing for explaining the operation of a map information processing apparatus in accordance with Embodiment 3 of the present invention.

Through the above-mentioned processing, when the user does not specify any specific detection end point by manipulating the input unit 130 during running over the predetermined distance or more or during the predetermined time period or more after the vehicle has returned to a registered road from the returning point, as shown in FIG. 15, the detection of an unregistered road automatically ends.

Figure 16:
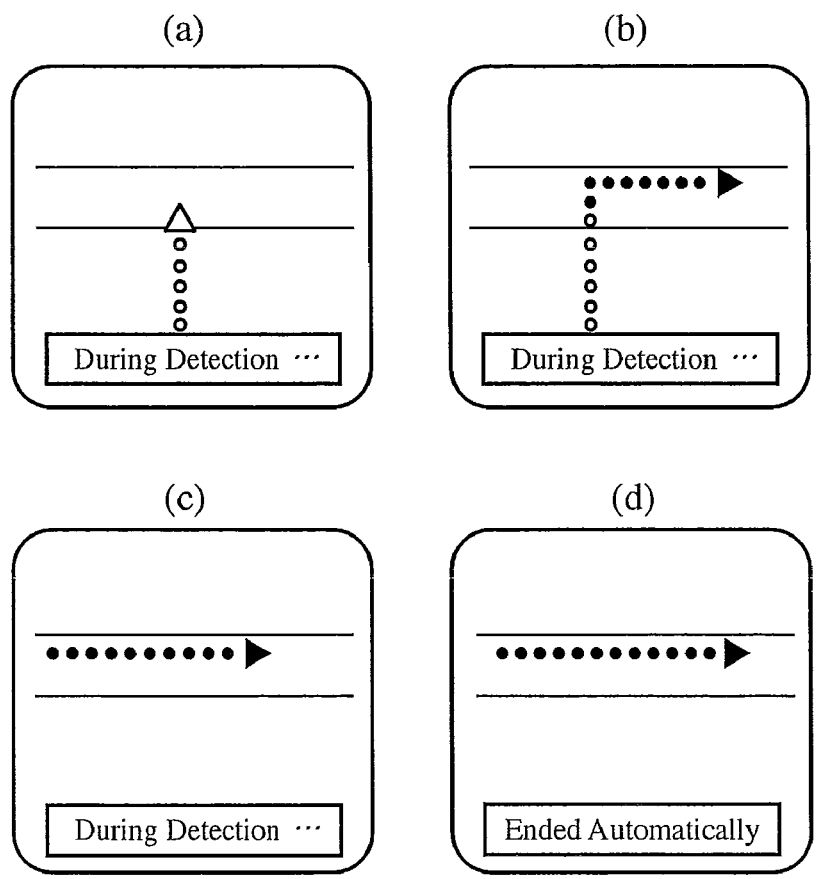
FIG. 16 is a view showing an example of display in a case in which detection of an unregistered road is ended in the map information processing apparatus in accordance with Embodiment 3 of the present invention.

In the case in which no specific detection end point is specified, the vehicle mark and roads are displayed together with a message of "During detection" on the display unit 150, as shown in FIG. 16(*a*), and, after that, as shown in FIGS. 16(*b*) and 16(*c*), the position of the vehicle is displayed together with a message of "During detection" according to the running of the vehicle while the vehicle position is updated with time. Then, when a state in which the vehicle does not depart from any registered road has continued during running over the predetermined distance or more or during the predetermined time period or more, the map information processing apparatus displays a message of "Detection has been ended automatically" and ends the process of detecting an unregistered road, as shown in FIG. 16(*d*).

Embodiment 4

A map information processing apparatus in accordance with Embodiment 4 of the present invention ends detection of the detection endpoint of an unregistered road when a vehicle makes a transition to a parked state after starting the detection of the detection start point of the unregistered road.

The structure of the map information processing apparatus in accordance with this Embodiment 4 is the same as that of the map information processing apparatus in accordance with Embodiment 1 except for the function of the positioning means 141. More specifically, in addition to calculating the current position of the vehicle, as mentioned above, the positioning means 141 detects the vehicle's state on the basis of the running speed and the brake state which are included in the vehicle speed information sent, as autonomous navigation data, from the speed sensor 120. More specifically, when the running speed sent from the speed sensor 120 is not zero, the positioning means 141 judges that the vehicle state is "during running", when the running speed is zero and the brake state shows the OFF state of the brake, the positioning means judges that the vehicle state is "at a stop", and, when the running speed is zero and the brake state shows the ON state of the brake, the positioning means judges that the vehicle state is "being parked." Data showing the vehicle state judged by this positioning means 141 is sent to both the road matching means 143 and the unregistered road detection means 144. The positioning means 141 in this case corresponds to a vehicle state acquiring unit in accordance with the present invention.

Next, the operation of the map information processing apparatus in accordance with Embodiment 4 of the present invention will be explained. Regular processing which is performed under normal operating conditions by the map information processing apparatus in accordance with Embodiment 4 is fundamentally the same as that of the map information processing apparatus in accordance with Embodiment 1 shown in the flow chart of FIG. 2, and the description of an unregistered road detection end point setting process performed in step ST17 by the map information processing apparatus in accordance with Embodiment 4 differs from that of the map information processing apparatus in accordance with Embodiment 1. Hereafter, the regular processing of the map information processing apparatus in accordance with this embodiment will be explained focusing on the point different from Embodiment 1.

Figure 17:
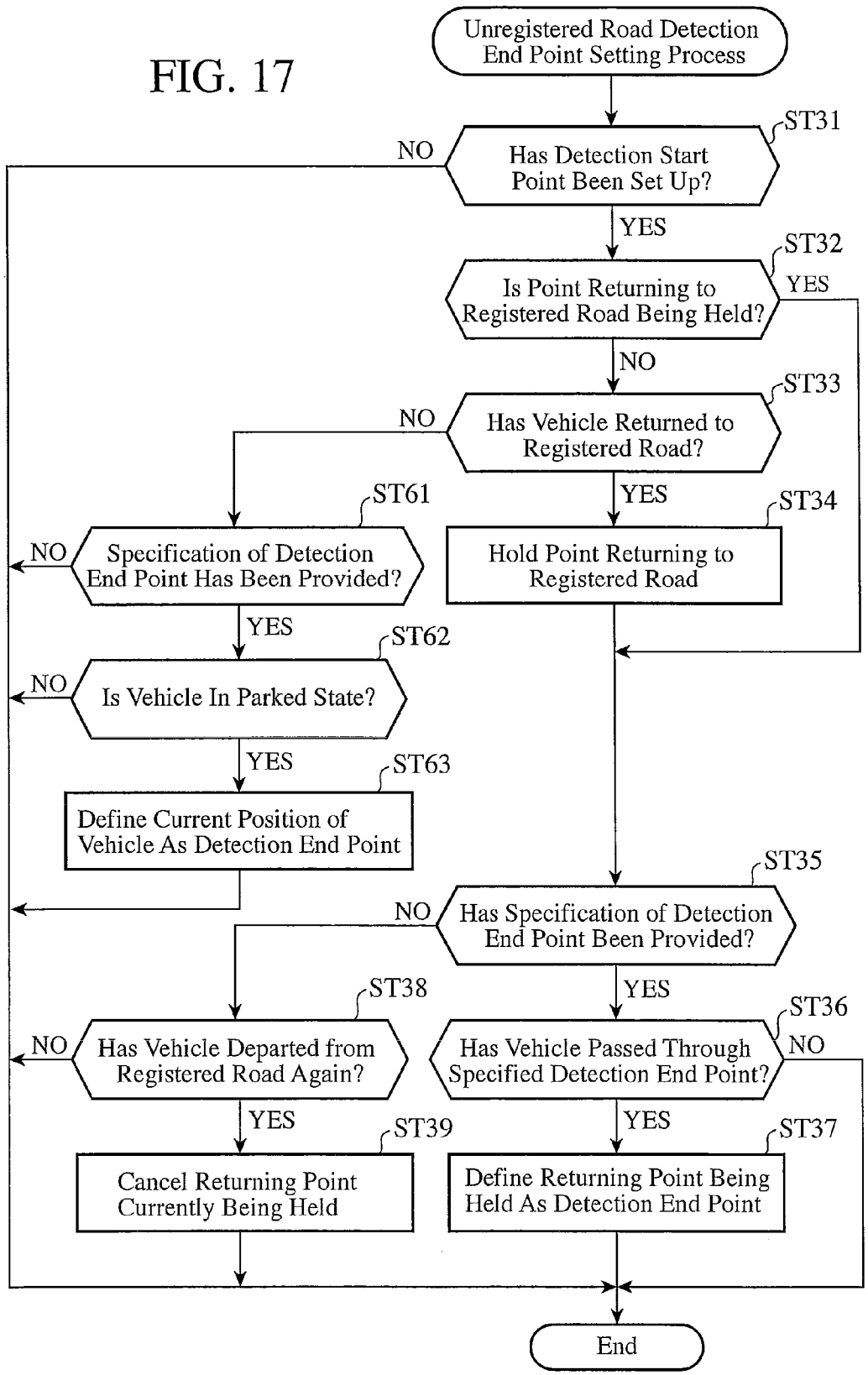
FIG. 17 is a flow chart showing the details of an unregistered road detection end point setting process carried out in step ST17 of regular processing of a map display device in accordance with Embodiment 4 of the present invention.

FIG. 17 is a flow chart showing the details of the unregistered road detection end point setting process performed in step ST17 of the regular processing. In this unregistered road detection end point setting process, steps ST61, ST62, and ST63 are added to the unregistered road detection end point setting process in accordance with Embodiment 1 shown in FIG. 7. The same steps as those of the process shown in the flow chart of FIG. 7 are designated by the same reference characters as those used in FIG. 7, and the explanation of the steps will be omitted hereafter.

More specifically, when, in step ST33, judging that the vehicle has not returned to any registered road, the unregistered road detection means advances the sequence to step ST61. The unregistered road detection means, in step ST61, checks to see whether an instruction for ending the detection has been issued. More specifically, the unregistered road detection means 144 checks to see whether an instruction for setting up a detection end point has been sent from the input unit 130 before the vehicle starts running or during the vehicle runs. When, in this step ST61, judging that an instruction for ending the detection has been issued, the unregistered road detection means then checks to see whether or not the vehicle is in a parked state (step ST62). More specifically, the unregistered road detection means 144 acquires the data showing the vehicle state from the positioning means 141 so as to check to see whether or not the vehicle is in the state of being parked. When, in this step ST61, judging that no instruction for ending the detection has been issued, the unregistered road detection means ends the unregistered road detection end point setting process without setting up the detection end point.

When, in above-mentioned step ST62, judging that the vehicle is in the state of being parked, the unregistered road detection means defines the current position of the vehicle as the detection end point (step ST63). More specifically, the unregistered road detection means 144 defines the current position of the vehicle which is acquired from the positioning means 141 as the detection end point for unregistered road detection. After that, the unregistered road detection means ends the unregistered road detection end point setting process. When, in step ST62, judging that the vehicle is not in the state of being parked, the unregistered road detection means ends the unregistered road detection end point setting process without setting up the detection end point.

As previously explained, the map information processing apparatus in accordance with Embodiment 4 can detect an unregistered road having a dead end, such as a parking lot of the user's house.

The map information processing apparatus in accordance with above-mentioned Embodiment 4 is constructed in such a way as to carry out the unregistered road detection end point setting process in which steps ST61, ST62, and ST63 are added to the unregistered road detection end point setting process in accordance with Embodiment 1 shown in FIG. 7. As an alternative, the map information processing apparatus in accordance with above-mentioned Embodiment 4 can be constructed in such a way as to carry out an unregistered road detection end point setting process in which processes corresponding to steps ST61, ST62, and ST63 shown in FIG. 17 are added to the unregistered road detection end point setting process in accordance with Embodiment 3 shown in FIG. 14.

Embodiment 5

A map information processing apparatus in accordance with Embodiment 5 of the present invention has a function of enabling the user to forcedly specify the detection start point of an unregistered road in addition to the functions of the map information processing apparatus in accordance with Embodiment 1.

The structure of the map information processing apparatus in accordance with this Embodiment 5 is the same as that of the map information processing apparatus in accordance with Embodiment 1. In the map information processing apparatus in accordance with this Embodiment 5, the input unit 130 is used also in order to enable the user to forcedly specify the detection start point.

Next, the operation of the map information processing apparatus in accordance with Embodiment 5 of the present invention will be explained. Regular processing which is performed under normal operating conditions by the map information processing apparatus in accordance with Embodiment 5 is fundamentally the same as that of the map information processing apparatus in accordance with Embodiment 1 shown in the flow chart of FIG. 2, and the description of an unregistered road detection start point setting process performed in step ST16 by the map information processing apparatus in accordance with Embodiment 5 differs from that of the map information processing apparatus in accordance with Embodiment 1. Hereafter, the regular processing of the map information processing apparatus in accordance with this embodiment will be explained focusing on the point different from Embodiment 1.

FIG. 18 is a flow chart showing the details of the unregistered road detection start point setting process performed in step ST16 of the regular processing. In this unregistered road detection start point setting process, steps ST71 and ST72 are added to the unregistered road detection start point setting process in accordance with Embodiment 1 shown in FIG. 3. Steps in which the same processes as those shown in the flow chart of FIG. 3 are performed are designated by the same reference characters as those used in FIG. 3, and the explanation of the steps will be omitted hereafter.

In the unregistered road detection start point setting process, the unregistered road detection means checks to see whether or not the detection start point has been forcedly specified first (step ST71). More specifically, the unregistered road detection means 144 checks to see whether the detection start point has been forcedly specified by way of the input unit 130. When, in this step ST71, judging that the detection start point has been forcedly specified, the unregistered road detection means defines the current position of the vehicle as the detection start point (step ST72). More specifically, the unregistered road detection means 144 acquires the current position data from the positioning means 141, and then defines the point shown by this current position data as the detection start point. After that, the unregistered road detection means ends the unregistered road detection start point setting process. In contrast, when, in this step ST71, judging that no detection start point has been forcedly specified, the unregistered road detection means advances the sequence to step ST21, and, after that, carries out the same process as that performed by the map information processing apparatus in accordance with Embodiment 1.

As explained above, the map information processing apparatus in accordance with Embodiment 5 makes it possible to start detection of an unregistered road at a dead end point, for example, a parking lot of the user's house. As an alternative, the map information processing apparatus can be constructed in such a way as to carry out an unregistered road detection start point setting process in which steps ST71 and ST72 are added to the process of Embodiment 2 shown in FIG. 11.

Embodiment 6

A map information processing apparatus in accordance with Embodiment 6 of the present invention has a function of enabling the user to forcedly specify the detection end point of an unregistered road in addition to the functions of the map information processing apparatus in accordance with Embodiment 1.

The structure of the map information processing apparatus in accordance with this Embodiment 6 is the same as that of the map information processing apparatus in accordance with Embodiment 1. In the map information processing apparatus in accordance with this Embodiment 6, the input unit 130 is used also in order to enable the user to forcedly specify the detection end point.

Next, the operation of the map information processing apparatus in accordance with Embodiment 6 of the present invention will be explained. Regular processing which is performed under normal operating conditions by the map information processing apparatus in accordance with Embodiment 6 is fundamentally the same as that of the map information processing apparatus in accordance with Embodiment 1 shown in the flow chart of FIG. 2, and the description of an unregistered road detection end point setting process performed in step ST17 by the map information processing apparatus in accordance with Embodiment 6 differs from that of the map information processing apparatus in accordance with Embodiment 1. Hereafter, the regular processing of the map information processing apparatus in accordance with this embodiment will be explained focusing on the point different from Embodiment 1.

FIG. 19 is a flow chart showing the details of the unregistered road detection end point setting process performed in step ST17 of the regular processing. In this unregistered road detection end point setting process, steps ST81 and ST82 are added to the unregistered road detection end point setting process in accordance with Embodiment 1 shown in FIG. 7. Steps in which the same processes as those shown in the flow chart of FIG. 7 are performed are designated by the same reference characters as those used in FIG. 7, and the explanation of the steps will be omitted hereafter.

In the unregistered road detection end point setting process, the unregistered road detection means checks to see whether or not the detection start point has been set up first (step ST31). When, in this step ST31, judging that no detection start point has been set up, the unregistered road detection means ends the unregistered road detection end point setting process. In contrast, when, in step ST31, judging that the detection start point has been set up, the unregistered road detection means then checks to see whether the detection end point has been forcedly specified (step ST81). More specifically, the unregistered road detection means 144 checks to see whether the detection end point has been forcedly specified by way of the input unit 130.

When, in this step ST81, judging that the detection end point has been forcedly specified, the unregistered road detection means defines the current position of the vehicle as the detection end point (step ST82). More specifically, the unregistered road detection means 144 acquires the current position data from the positioning means 141, and then defines the point shown with this current position data as the detection end point. After that, the unregistered road detection means ends the unregistered road detection end point setting process. In contrast, when, in step ST81, judging that no detection end point has been forcedly specified, the unregistered road detection means advances the sequence to step ST32, and, after that, carries out the same process as that performed by the map information processing apparatus in accordance with Embodiment 1.

As explained above, the map information processing apparatus in accordance with Embodiment 6 makes it possible to end the detection of an unregistered road at a dead end point, for example, a parking lot of the user's house. As an alternative, the map information processing apparatus can be constructed in such a way as to carry out an unregistered road detection end point setting process in which steps ST81 and ST82 are added to either the process of Embodiment 3 shown in FIG. 14 or the process of Embodiment 4 shown in FIG. 17.

INDUSTRIAL APPLICABILITY

As mentioned above, because the map information processing apparatus in accordance with the present invention is constructed in such a way as to, when the specified detection start point and the specified detection end point of an unregistered road are inputted from the input unit, detect, as the unregistered road, a section between the detection start point and the detection end point of the unregistered road which are acquired on the basis of either map matching performed by the road matching means or the result of comparison between the running track data read from the memory and the road data read from the map data storage means, the map information processing apparatus can prevent incorrect matching from being established between the running track data and the road data and can acquire correct data about the unregistered road. Therefore, the map information processing apparatus is suitable for use in a map information processing apparatus or the like which is built in a vehicle-mounted navigation apparatus.

The invention claimed is:

1. A map information processing apparatus comprising:
a memory;
a map data storage means for storing map data including road data about registered roads;
an input unit; and
a signal processing unit programmed to execute a process of:
measuring a current position of a vehicle;
storing in said memory, as running track data, the measured current position;
comparing a registered road shown by road data read from said map data storage means with the measured current position measured to carry out map matching;
receiving, via the input unit, input from a user of both a specified detection start point which is a point at which detection of an unregistered road is to be started, and a specified detection end point which is a point at which the detection is to be ended;
detecting, as the unregistered road, a section between a detection start point and a detection end point of the unregistered road which are acquired on a basis of either the map matching carried out by said signal processing unit or a result of comparison between the running track data read from said memory and road data read from said map data storage means; and
generating road data corresponding to the detected unregistered road, and then storing the road data in said map data storage means,
wherein when the specified detection end point inputted from the input unit is a point the vehicle arrives at before arriving at the detection end point of the unregistered road, the signal processing unit defines a point at which the vehicle returns to a registered road which has been judged to match a point in the map data by the carried-out map matching as the detection end point.

2. The map information processing apparatus according to claim 1, wherein when the specified detection start point inputted from the input unit is a point the vehicle arrives at before arriving at the detection start point of the unregistered road, the signal processing unit defines a point at which the vehicle departs from a registered road which has been judged not to match any points in the map data by the carried-out map matching as the detection start point.

3. The map information processing apparatus according to claim 1, wherein when the specified detection start point inputted from the input unit is a point the vehicle arrives at after arriving at the detection start point of the unregistered road, the signal processing unit defines a point at which the vehicle departs from a registered road for which no matching between the running track data read from the memory and the road data read from the map data storage means is established as the detection start point.

4. The map information processing apparatus according to claim 1, wherein when the specified detection start point is inputted from the input unit, if map matching is achieved by the signal processing unit and a state in which no departure of the vehicle from any registered road has continuously been found while the vehicle has traveled over a predetermined distance or more or a predetermined time period or more, the signal processing unit ends the detection of the unregistered road.

5. The map information processing apparatus according to claim 1, wherein said map information processing apparatus includes a vehicle state acquiring unit for acquiring a vehicle state showing whether the vehicle is traveling, at a stop, or being parked, and, when the specified detection end point is inputted from the input unit and the vehicle state acquired by said vehicle state acquiring unit shows that the vehicle is being parked, defines the current position measured by the signal processing unit as the detection end point.

6. The map information processing apparatus according to claim 1, wherein when detecting a point from which the vehicle departs from a registered road and a point at which the vehicle returns to a registered road, the signal processing unit reduces a degree of correction of the measured current position of the vehicle while carrying out the map matching.

7. The map information processing apparatus according to claim 6, wherein said map information processing apparatus includes a display means for displaying the current position, and the signal processing unit carries out general map matching in which the degree of correction is not reduced, in parallel with the map matching in which the degree of correction is reduced, and said display means displays the current position according to a result of the general map matching carried out by said signal processing unit.

8. The map information processing apparatus according to claim 1, wherein when a registered road exists between the detection start point and the detection end point of the unregistered road, according to an instruction inputted from the input unit, the signal processing unit detects, as unregistered roads, a section from the detection start point to a start point of said registered road, and a section from an end point of said registered road to the detection end point, or detects, as an unregistered road, a section from the detection start point to the detection end point including said registered road.

9. The map information processing apparatus according to claim 1, wherein after the specified detection start point is inputted from the input unit, the signal processing unit cancels the detection of the unregistered road according to a cancellation instruction inputted from said input unit.

10. The map information processing apparatus according to claim 1, wherein before the vehicle starts travelling, at least one of a registered road connected to the detection start point of the unregistered road and a registered road connected to the detection end point of the unregistered road is inputted to the signal processing unit from the input unit.

11. The map information processing apparatus according to claim 1, wherein when the specified detection start point is forcedly specified from the input unit, the signal processing unit defines the measured current position as the detection start point.

12. The map information processing apparatus according to claim 1, wherein when the specified detection end point is forcedly specified from the input unit, the signal processing unit defines the measured current position as the detection end point.

13. A map information processing apparatus comprising:
a memory;
a map data storage means for storing map data including road data about registered roads;
an input unit; and
a signal processing unit programmed to execute a process of:
measuring a current position of a vehicle;
storing in said memory, as running track data, the measured current position;
comparing a registered road shown by road data read from said map data storage means with the measured current position measured to carry out map matching;
receiving via the input unit input from a user of both a specified detection start point which is a point at which detection of an unregistered road is to be started, and a specified detection end point which is a point at which the detection is to be ended;

detecting, as the unregistered road, a section between a detection start point and a detection end point of the unregistered road which are acquired on a basis of either the map matching carried out by said signal processing unit or a result of comparison between the running track data read from said memory and road data read from said map data storage means; and generating road data corresponding to the detected unregistered road, and then storing the road data in said map data storage means, wherein when the specified detection end point inputted from the input unit is a point the vehicle arrives at after arriving at the detection end point of the unregistered road, the signal processing unit defines a point at which the vehicle returns to a registered road for which matching between the running track data read from the memory and the road data read from the map data storage means is established as the detection end point.

14. The map information processing apparatus according to claim 13, wherein when the specified detection end point is not inputted from the input unit and map matching has been achieved continuously by the signal processing unit while the vehicle has traveled over a predetermined distance or more or a predetermined time period or more, the signal processing unit defines a point returning to a registered road which has been judged to match a point in the map data by the carried-out map matching as the detection end point.

* * * * *